US011407386B2

(12) United States Patent
Mondro et al.

(10) Patent No.: US 11,407,386 B2
(45) Date of Patent: Aug. 9, 2022

(54) VEHICLE TURNTABLE

(71) Applicant: Czarnowski Display Service, Inc., Chicago, IL (US)

(72) Inventors: John Mondro, Pinckney, MI (US); Jeffrey Ries, Shelby Township, MI (US); Jeff Keyes, St. George, UT (US); Charlie Baier, Douglasville, GA (US); Michael King, Commerce Township, MI (US); Steve Bergeron, St. Clair Shores, MI (US); Patrick McGrath, West Bloomfield, MI (US); Tim Oughton, Kennesaw, GA (US); Ron Dykes, Canton, MI (US); William Camp, Santa Clara, UT (US); Michael Clark, Battle Creek, MI (US); Peter Jungen, Climax, MI (US); Jason Fox, Richland, MI (US)

(73) Assignee: Czarnowski Display Service, Inc., Chicago, IL (US)

( * ) Notice: Subject to any disclaimer, the term of this patent is extended or adjusted under 35 U.S.C. 154(b) by 108 days.

(21) Appl. No.: 16/563,587

(22) Filed: Sep. 6, 2019

(65) Prior Publication Data

US 2019/0389436 A1 Dec. 26, 2019

Related U.S. Application Data

(62) Division of application No. 15/087,549, filed on Mar. 31, 2016, now Pat. No. 10,407,032.

(51) Int. Cl.
*B60S 13/02* (2006.01)
*E04H 6/40* (2006.01)
*E04H 6/28* (2006.01)

(52) U.S. Cl.
CPC ............... *B60S 13/02* (2013.01); *E04H 6/28* (2013.01); *E04H 6/40* (2013.01)

(58) Field of Classification Search
CPC . B60S 13/02; E04H 6/28; E04H 6/282; E04H 6/40; A47F 5/025; B61J 1/02
(Continued)

(56) References Cited

U.S. PATENT DOCUMENTS 3,613,909 A * 10/1971 Salloum .................... E04H 6/28
414/260
4,172,422 A * 10/1979 McBride ................. B60S 13/02
104/38

(Continued)

FOREIGN PATENT DOCUMENTS

CN 104453314 A * 3/2015
EP 3162982 A1 5/2017

*Primary Examiner* — Zachary L Kuhfuss
(74) *Attorney, Agent, or Firm* — Neal, Gerber & Eisenberg LLP; Nawshaba M. Siddiquee

(57) ABSTRACT

Embodiments include a vehicle turntable comprising a central hub communicatively coupled to a control unit for receiving control signals; a plurality of wedge-shaped panels radially coupled to the central hub so as to form a circular surface; a plurality of wheels coupled to a number of the plurality of panels; and at least one motor configured to drive a corresponding one of the plurality of wheels and to receive the control signals from the central hub. Embodiments also include a system comprising a first turntable hub configured to control operation of a first turntable; and a control unit communicatively coupled to the first turntable hub to provide control signals to the first turntable hub.

21 Claims, 23 Drawing Sheets

(58) Field of Classification Search
USPC .......................................................... 105/159
See application file for complete search history.

(56) References Cited

U.S. PATENT DOCUMENTS

| | | | |
|---|---|---|---|
| 4,498,398 | A | 2/1985 | Vallee |
| 4,608,929 | A | 9/1986 | Park |
| 4,716,837 | A | 1/1988 | Valencia |
| 4,753,173 | A | 6/1988 | James |
| 5,086,704 | A | 2/1992 | Mueller |
| 5,469,676 | A * | 11/1995 | Colsman ................. E04H 6/285 52/174 |
| 5,626,079 | A | 5/1997 | Summers |
| 5,755,160 | A | 5/1998 | Blufordcraving |
| 6,672,221 | B2 | 1/2004 | Hadley |
| 6,817,300 | B2 | 11/2004 | Schwenker |
| 6,877,437 | B2 | 4/2005 | Murdock |
| 7,631,602 | B2 | 12/2009 | Schwenker |
| 7,798,067 | B2 | 9/2010 | Starnes |
| 7,966,939 | B2 | 6/2011 | Holt |
| 8,424,458 | B2 | 4/2013 | Holt |
| 10,407,032 | B2 | 9/2019 | Mondro et al. |
| 2003/0233958 | A1 | 12/2003 | D'Alessandro, Jr. |
| 2010/0086385 | A1* | 4/2010 | Shani ....................... E04H 6/22 414/232 |
| 2011/0214592 | A1 | 9/2011 | Holt |
| 2013/0078063 | A1 | 3/2013 | Shani |
| 2014/0261052 | A1* | 9/2014 | Baxter .................... A63G 1/10 104/74 |
| 2017/0282868 | A1 | 10/2017 | Mondro et al. |
| 2019/0226225 | A1* | 7/2019 | Tang ........................ E04H 6/18 |

\* cited by examiner

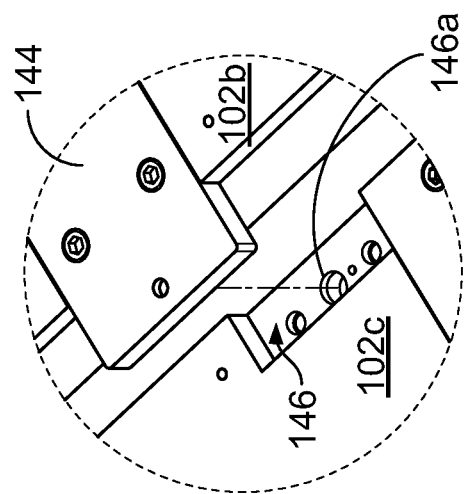
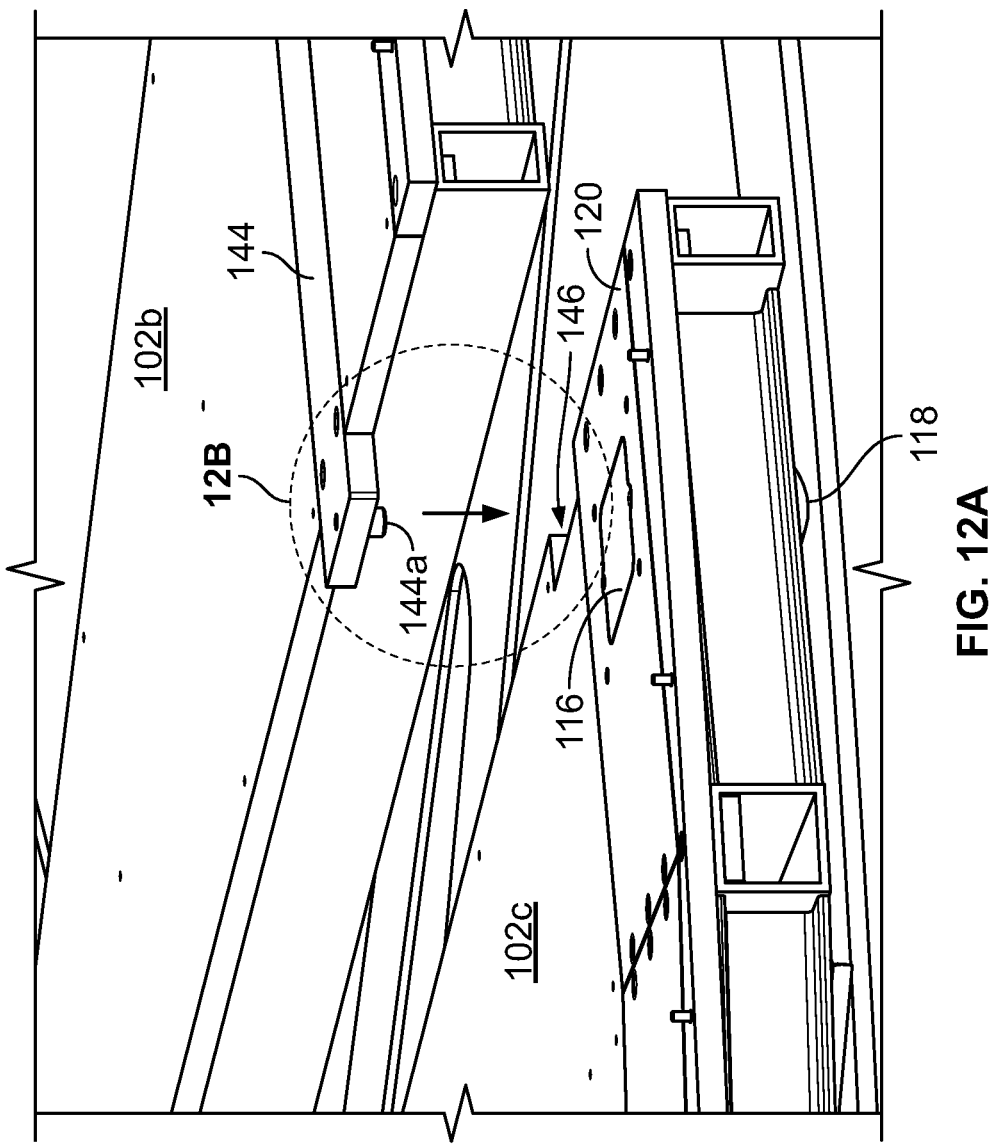
FIG. 12B
FIG. 12A

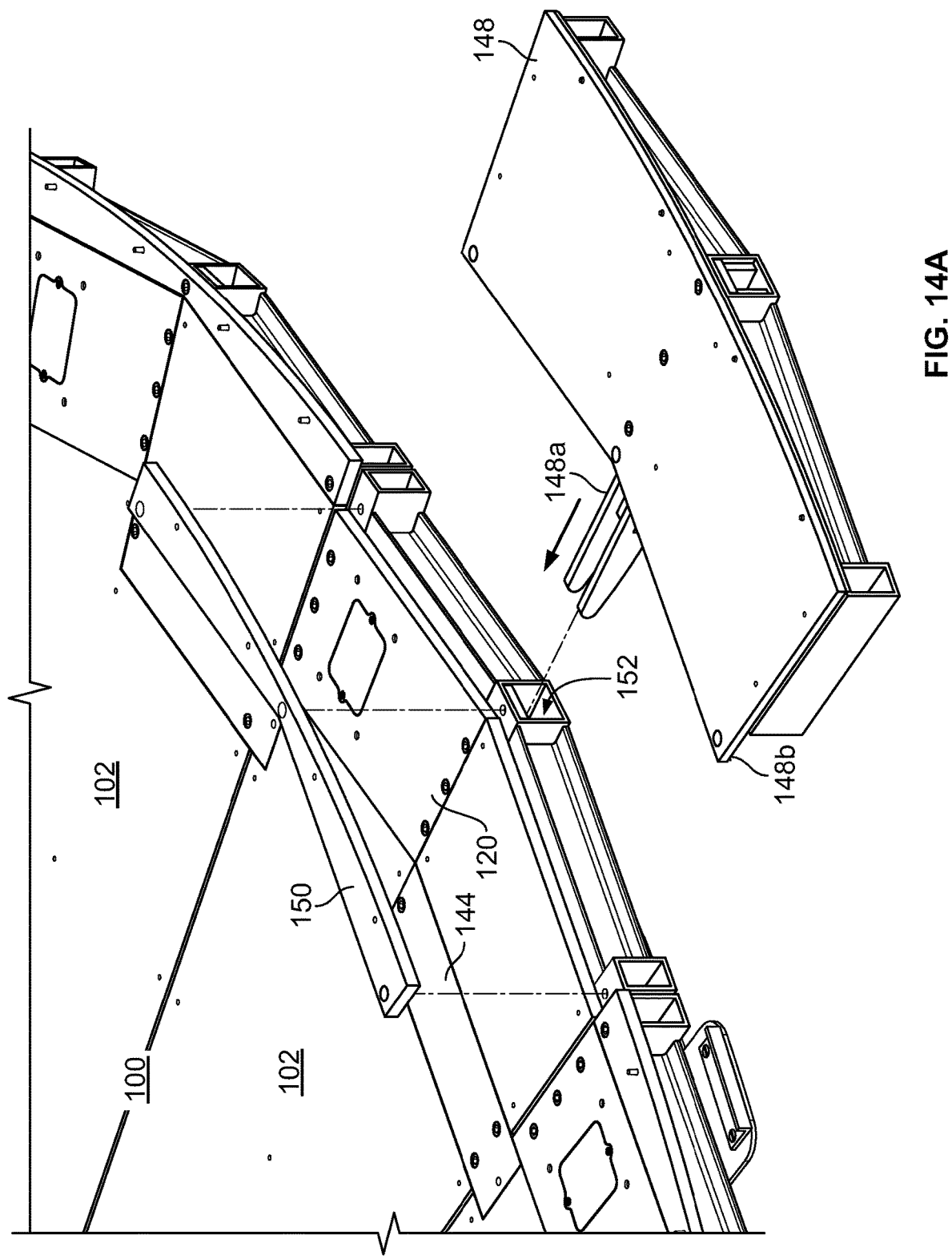

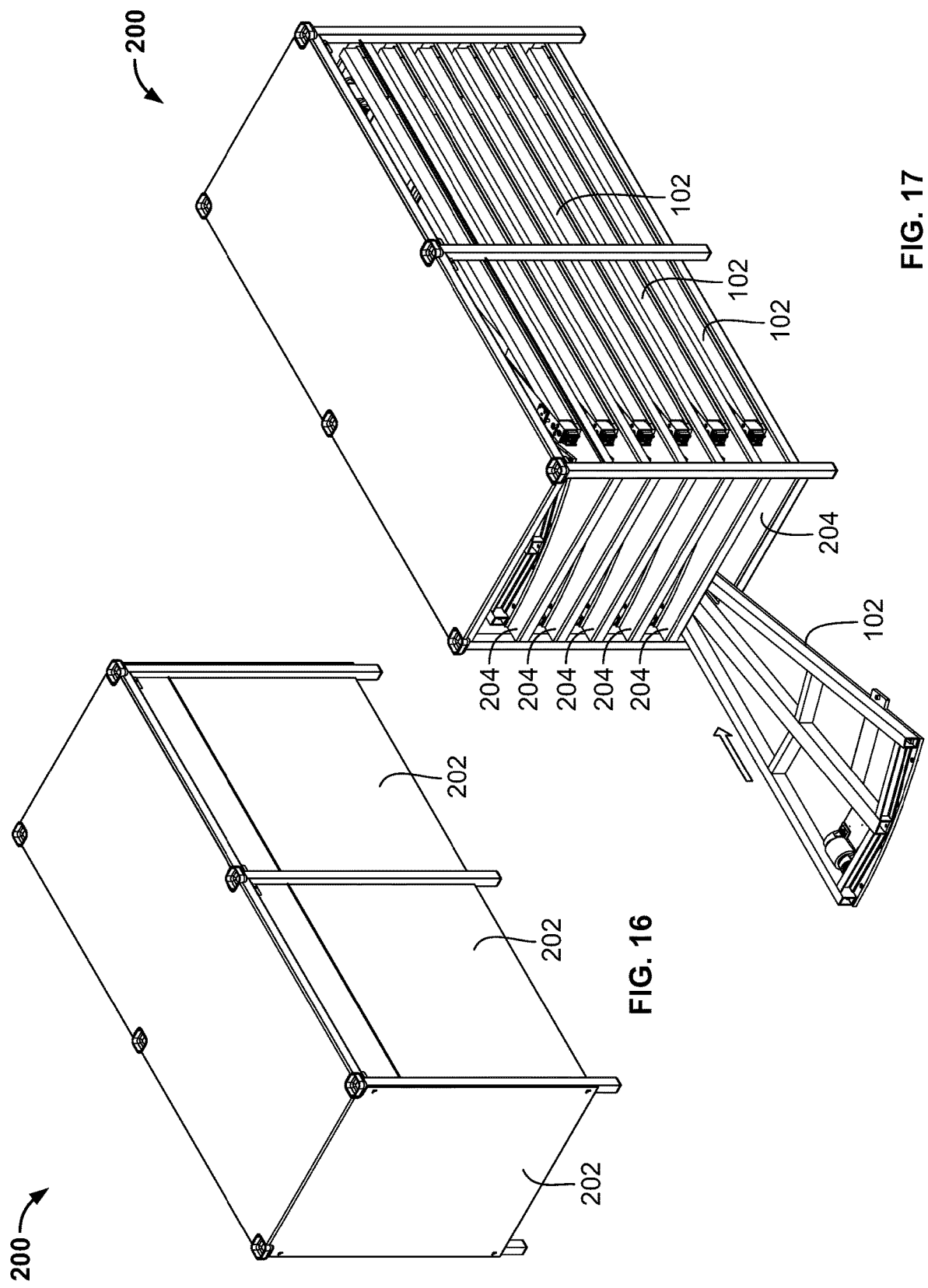

VEHICLE TURNTABLE

CROSS-REFERENCE TO RELATED APPLICATION

This application claims the benefit of U.S. patent application Ser. No. 15/087,549, filed on Mar. 31, 2016, the contents of which are incorporated herein by reference in their entirety.

BACKGROUND

The description that follows relates generally to turntables for displaying a vehicle or other large object.

Turntables can be used to display a vehicle on a rotating platform for various applications, including commercial, residential, and industrial purposes. Some turntables are permanent fixtures, while others are temporary or portable fixtures. Permanent turntables may be found in, for example, home driveways and garages or car dealer showrooms, and may be built in-ground or above-ground. In-ground turntables require excavation in order to place the turntable flush with the ground surface. Above-ground turntables are mounted onto the existing ground surface and, as a result, are at least slightly raised above ground. Portable turntables are used at, for example, car shows or entertainment venues, and are installed above-ground for ease of setup and breakdown. Such turntables are typically transported to the installation site in piecemeal and assembled on site.

Conventional turntables typically include only one electrical motor for driving rotation of the table. As a result, if this electrical motor fails, the turntable stops working entirely. Some turntables have an inboard motor attached underneath the turntable. In such cases, technicians may need to remove at least a portion of the turntable to access the motor for repair purposes. Other turntables have an outboard motor attached to the side of the table, thus providing easier access to the motor in the event of failure. However, regardless of where the motor is placed, the turntable will not resume operation until the repairs are done.

SUMMARY

An improved vehicle turntable is provided herein. In one embodiment, a vehicle turntable includes a central hub communicatively coupled to a control unit for receiving control signals; a plurality of wedge-shaped panels radially coupled to the central hub so as to form a circular surface; a plurality of wheels coupled to a number of the plurality of panels; and at least one motor configured to drive a corresponding one of the plurality of wheels and to receive the control signals from the central hub. According to aspects of this embodiment, the control signals are configured to control a direction of travel and a rotational speed of the turntable, to stop rotation of the turntable at a user-selected position, and/or to enable or disable the at least one motor. According to other aspects of this embodiment, the control signals comprise user-selected control settings entered into the control unit and/or control settings automatically selected by a processor executing software for controlling the turntable. According to still other aspects of this embodiment, the at least one motor includes a first motor configured to drive a first wheel and a second motor configured to drive a second wheel, and in some cases, the first motor and the second motor operate simultaneously. According to other aspects of this embodiment, the control signals are received from the control unit via a wireless connection and/or via a wired connection.

In another embodiment, a system includes a first turntable hub configured to control operation of a first turntable; and a control unit communicatively coupled to the first turntable hub to provide control signals to the first turntable hub. According to aspects of this embodiment, the control signals comprise user-selected control settings entered into the control unit and/or control settings automatically selected by a processor executing software for controlling the turntable. According to other aspects of this embodiment, the system further includes a second turntable hub configured to control operation of a second turntable, wherein the control unit is communicatively coupled to the second turntable hub to provide the same control signals to the second turntable hub, and a communication network configured to enable data transmission between the control unit and the second turntable hub. In such cases, the communication network can be further configured to enable data transmission between the control unit and the first turntable hub, and in some cases, the first turntable hub is configured to operate as a master table and the second turntable hub is configured to operate as a slave table.

According to other aspects of this embodiment, the control unit is a central controller communicatively coupled to a plurality of turntable hubs and to the communication network. In such cases, the system can further include a first turntable control unit communicatively coupled to the first turntable hub and to the control unit for relaying control signals from the control unit to the first turntable hub and/or a second turntable control unit communicatively coupled to the second turntable hub and to the control unit for relaying control signals from the control unit to the second turntable hub.

In yet another embodiment, a vehicle turntable includes a central hub; a plurality of wedge-shaped panels radially coupled to the central hub so as to form a circular surface; a track extending concentrically around the central hub; a plurality of wheels respectively coupled to a number of the wedge-shaped panels and configured to slidably engage the track; and a first motor configured to drive a first wheel of the plurality of wheels along the track. According to aspects of this embodiment, each panel can include at least one handhold for manually gripping the panel. According to other aspects, the vehicle turntable further includes a plurality of bridge plates, each bridge plate transversely coupled to a pair of adjacent panels, and/or a plurality of support plates coupled to the central hub at one end and to the track at an opposite end, the support plates, the track, and the central hub forming a frame assembly for supporting the plurality of wedge-shaped panels.

According to another aspect of this embodiment, each of the number of wedge-shaped panels includes a removable panel to provide access to the wheel coupled to that wedge-shaped panel. According to still another aspect of this embodiment, the vehicle turntable further includes a plurality of extenders respectively coupled to the plurality of wedge-shaped panels at an outer end of each panel, the extenders being configured to increase a diameter of the turntable. According to other aspects, the vehicle turntable further includes a second motor configured to drive a second wheel of the plurality of wheels along the track. In such cases, the second motor is configured to become engaged upon failure of the first motor. According to other aspects, the vehicle turntable further includes a third motor configured to drive a third wheel of the plurality of wheels along the track. In such cases, the third motor is configured to become engaged upon failure of the second motor. According to still other aspects of this embodiment, the vehicle turntable includes the first, second, and third motors and the motors are configured to operate in synchrony.

According to still other aspects of this embodiment, the vehicle turntable further includes a control box for providing power and control signals to the central hub. According to other aspects of this embodiment, the central hub is communicatively coupled to the first motor for providing the control signals to the first motor. According to another aspect of this embodiment, the central hub includes a rotating electrical connector communicatively coupled to the control box and the first motor. According to yet another aspect, the first motor is a servomotor. According to still another aspect, the first motor is included in the wedge-shaped panel coupled to the first wheel.

In another embodiment, a method for controlling operation of a vehicle turntable comprising a first motor, a second motor, and a third motor is provided. The method includes synchronizing operation of the first, second, and third motors; upon detecting failure of the first motor, automatically deactivating the first motor; and upon detecting failure of the second motor, automatically deactivating the second motor.

In still another embodiment, a method comprises receiving one or more control settings for a first turntable; receiving a master mode setting from the first turntable; receiving a slave mode setting from a second turntable; automatically applying the one or more control settings of the first turntable to the second turntable; and synchronizing a movement of the second turntable to match a movement of the first turntable. According to one aspect of this embodiment, the one or more control settings include at least one of a direction of travel setting, a target position setting, and a rotational speed setting.

In yet another embodiment, a method comprises receiving, at a first turntable, a slave mode setting via a control unit; receiving one or more control settings from a second turntable via a wireless receiver of the control unit; and applying the one or more control settings to the first turntable. According to one aspect of this embodiment, the one or more control settings include at least one of a direction of travel setting, a target position setting, and a rotational speed setting.

A better understanding of the invention will be obtained from the following detailed descriptions and accompanying drawings, which set forth illustrative embodiments that are indicative of the various ways in which the principals of the invention may be employed.

BRIEF DESCRIPTION OF THE DRAWINGS

FIGS. 12A and 12B are partial, close-up views of the vehicle turntable shown in FIG. 1 during an exemplary sixth stage of assembly, in accordance with embodiments;

FIG. 14A is a top perspective view of a portion of an outer edge of the vehicle turntable shown in FIG. 1 and an example extender for extending a diameter of the vehicle turntable, in accordance with embodiments;

FIG. 16 is a top perspective view of an example storage crate for storing disassembled pieces of the vehicle turntable shown in FIG. 1, in accordance with embodiments;

FIG. 17 is a top perspective view of the storage crate shown in FIG. 16 with outer panels removed and wedge-shaped panels arranged on the shelves of the storage crate, in accordance with embodiments;

Figure 1:
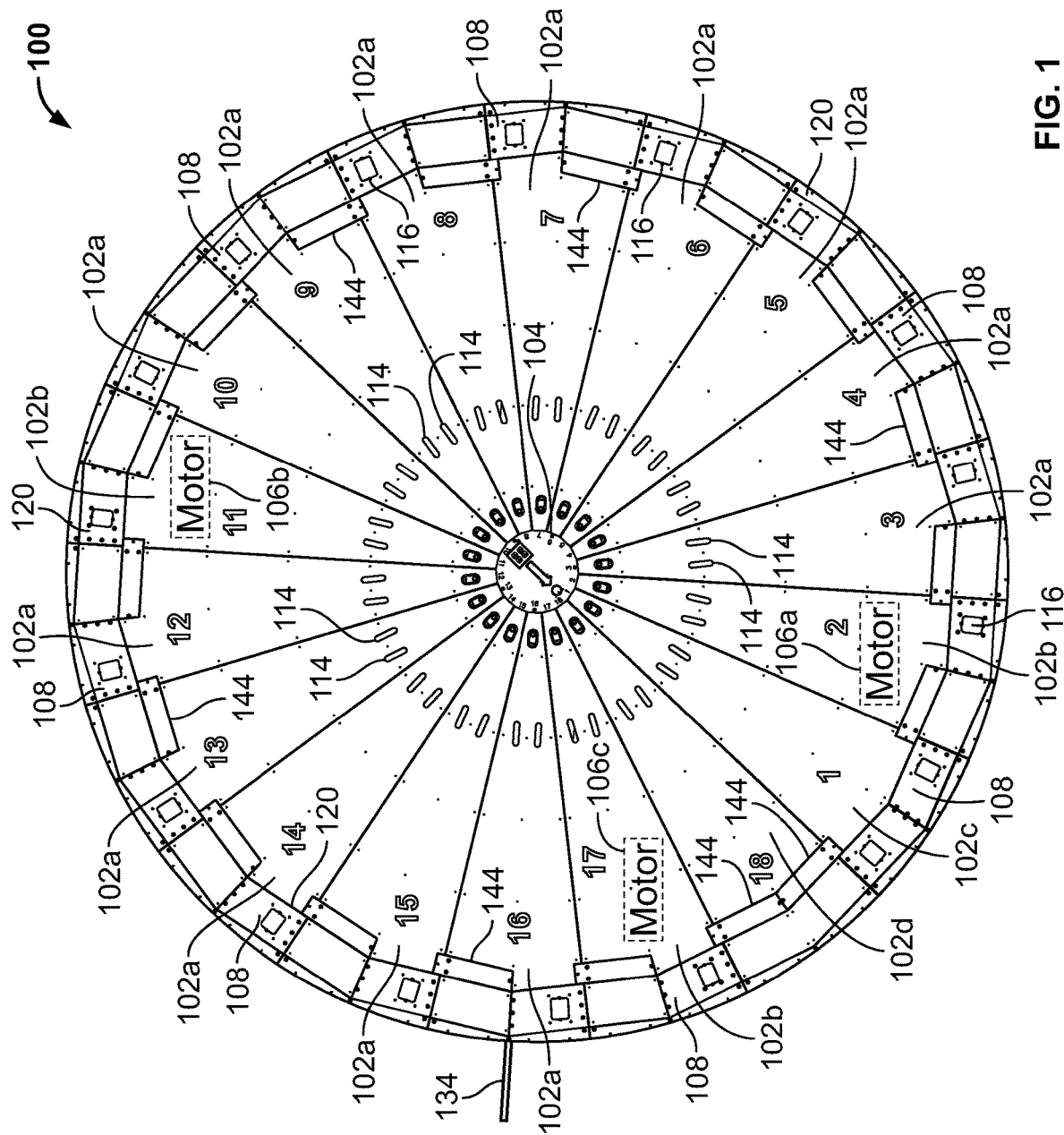
FIG. 1 is a top plan view of an exemplary vehicle turntable, in accordance with embodiments.

Illustrative and exemplary embodiments of the invention are described in further detail below with reference to and in conjunction with the figures.

DETAILED DESCRIPTION

The description that follows describes, illustrates and exemplifies one or more embodiments of the invention in accordance with its principles. This description is not provided to limit the invention to the embodiment(s) described herein, but rather to explain and teach the principles of the invention in order to enable one of ordinary skill in the art to understand these principles and, with that understanding, be able to apply them to practice not only the embodiment(s) described herein, but also any other embodiment that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers or serial numbers in cases where such labeling facilitates a more clear description. Additionally, the drawings set forth herein are not necessarily drawn to scale, and in some instances proportions may have been exaggerated to more clearly depict certain features. As stated above, this specification is intended to be taken as a whole and interpreted in accordance with the principles of the invention as taught herein and understood by one of ordinary skill in the art.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects.

FIG. 1 depicts an example vehicle turntable 100 in accordance with embodiments. As shown, the vehicle turntable 100 includes a plurality of wedge-shaped panels 102 (also referred to as "pie sections") that are radially arranged around a central hub 104 to form a circular surface for displaying a vehicle or other large object. Each panel 102 is contiguously coupled with neighboring panels 102 and tapers from an outer edge to an inner edge, so as to form a wedge. In the illustrated embodiment, the turntable 100 is shown as having eighteen wedge-shaped panels 102. In other embodiments, the total number of panels 102 can vary depending on, for example, a size and shape of each panel 102, an overall diameter of the turntable 100, and/or a desired number of panels 102.

As shown, the vehicle turntable 100 can include one or more inboard motors 106 configured to cause the turntable 100 to rotate by driving one or more wheels (such as, e.g., wheels 108 shown in FIGS. 2 and 3) included on an underside of a number of the panels 102. In the illustrated embodiment, the vehicle turntable 100 includes three motors 106 that are integrated into select panels 102 arranged at predetermined locations around the turntable 100. The use of three motors 106 provides several advantages over conventional turntables with a single motor. For example, due to the presence of three motors 106, the turntable 100 can better handle heavier loads and uneven or off-centered loads due to the extra motor power, and can provide an enhanced leveling ability on uneven surfaces because, for example, the remaining motors 106 can make up for a motor 106 that is tilted off the ground due to an uneven surface.

In some cases, the plurality of motors 106 can be arranged in select panels 102 that are approximately equidistance from each other. In other cases, the motors 106 can be arranged in select panels 102 depending on a desired weight distribution across the turntable 100, wheel placement underneath the turntable 100, and/or other relevant factors that may affect rotation and leveling of the turntable 100.

In some cases, the motors 106 can be configured to operate individually, or one at a time, and be programmed to form a built-in redundancy system that ensures continued operation of the turntable 100 in the event of motor failure. For example, one of the motors 106 can be designated as a primary motor (e.g., motor 106a) and can be enabled to drive the entire turntable 100. The other two motors 106 can be designated as secondary motors (e.g., motors 106b and 106c) and can remain disabled or in stand-by mode as long as the primary motor is operational. If the primary motor fails, the motor may become automatically disabled or enter an idle mode that causes the failed motor to coast as the turntable 100 continues to rotate. Upon failure of the primary motor, one of the secondary motors (e.g., motor 106b) can become engaged and begin driving the turntable 100, while the other secondary motor 106 (e.g., 106c) can remain in stand-by mode in case of another motor failure. As will be appreciated, in some cases, the turntable 100 may include only two motors 106, the second motor serving as a back-up motor for the primary motor.

In other cases, all of the motors 106 can be configured to run simultaneously, and can be configured to ensure continued operation of the turntable 100 even if one of the motors 106 fails. For example, in the event of a motor failure, the failed motor 106 can become idle or disengaged, while the other motor(s) 106 can continue operating without interrupting turntable movement. In addition, each of the motors 106 can be configured to rotate at the same speed to enable the motors 106 to operate in synchrony with little or no re-programming.

In embodiments, each of the motors 106 can be configured to provide sufficient rotational power for driving the entire turntable 100 and handling a predetermined weight capacity for the turntable 100 (e.g., up to 12,000 pounds). For example, the motors 106 can have a gear ratio of 40:1, or any other gear ratio that is sufficient to turn the turntable 100 using any one of the motors 106. In this manner, turntable operation can continue even with only one operating motor 106, for example, after a double motor failure.

In some embodiments, the motors 106 can be configured as servomotors to enable more precise control of the angular or linear position, velocity, and/or acceleration of the motors 106. In addition, the servomotors 106 can be configured to communicate with each other, for example, using handshaking or other known techniques, to synchronize operation of the motors 106 and/or to turn on a second motor 106 when a first motor 106 fails.

Figure 21:
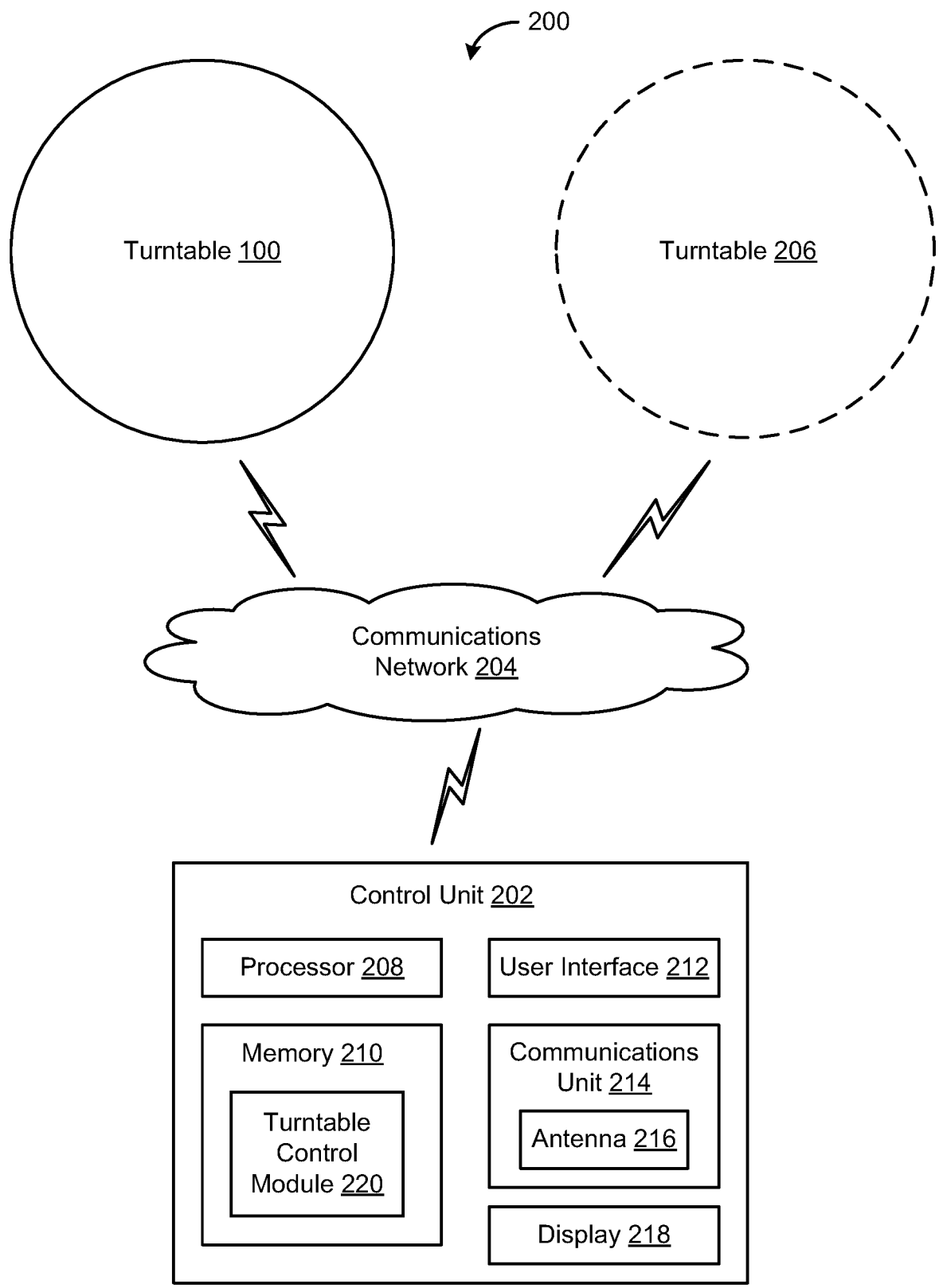
FIG. 21 is a block diagram of an example system for operating the vehicle turntable shown in FIG. 1, in accordance with embodiments.

In embodiments, each of the servomotors 106 may be coupled to, or include, a controller (not shown) and a position sensor (not shown). The position sensor can be configured to obtain position feedback, and the controller can be configured to control the motor's motion and final position based on the position feedback and a control input representing a target position (also referred to as a "command position"). In a preferred embodiment, the controller and the position sensor are included in the central hub 104 (e.g., as shown in FIG. 21) and are communicatively coupled to each of the motors 106 via wired connections or cables. In other embodiments, a separate controller and position sensor may be assigned to each motor 106 and may be integrated into corresponding panels 102 along with the motors 106.

Figure 2:
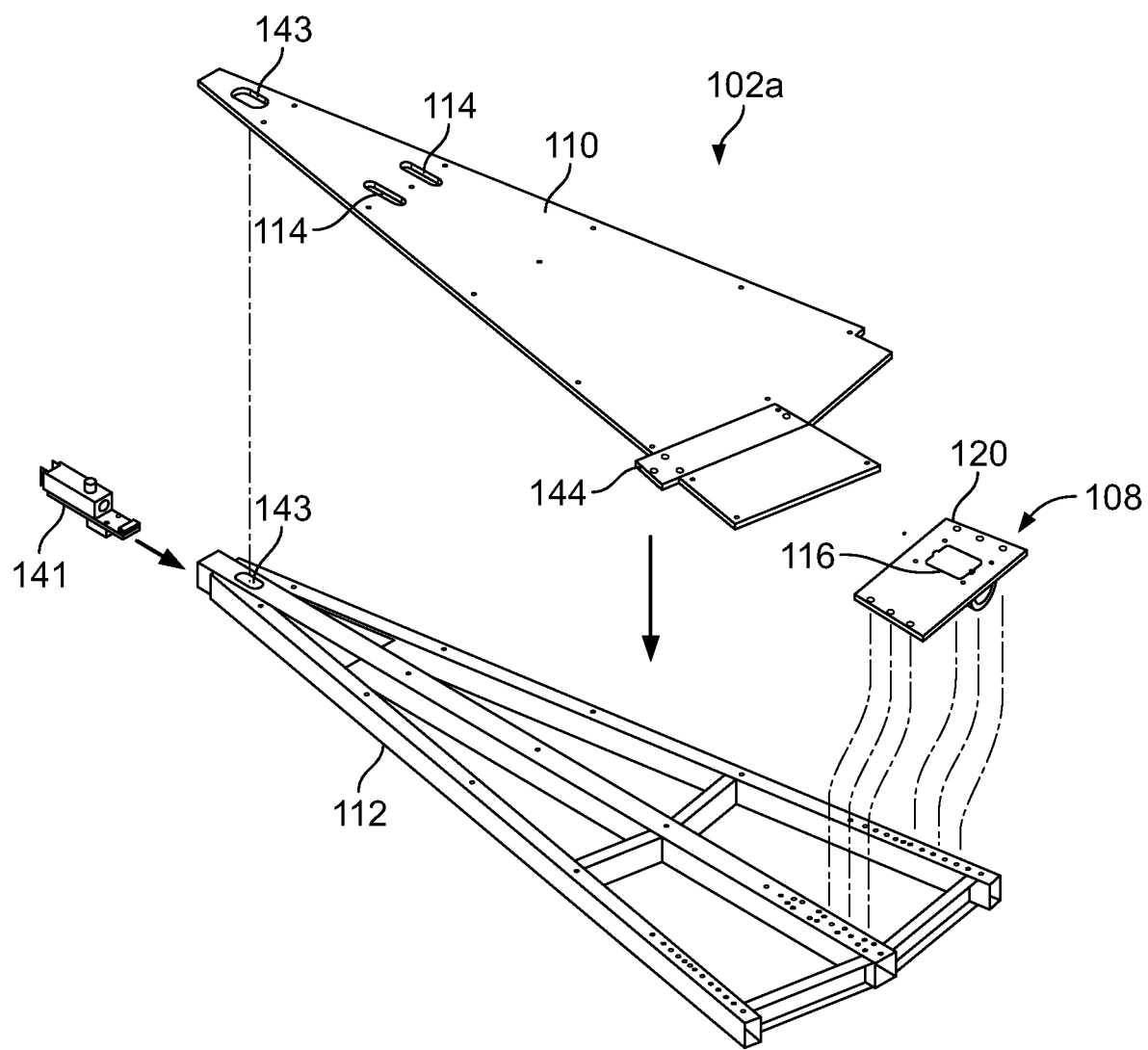
FIG. 2 is a partially-exploded, front perspective view of an example first wedge-shaped panel of the vehicle turntable shown in FIG. 1, in accordance with embodiments.
Figure 3:
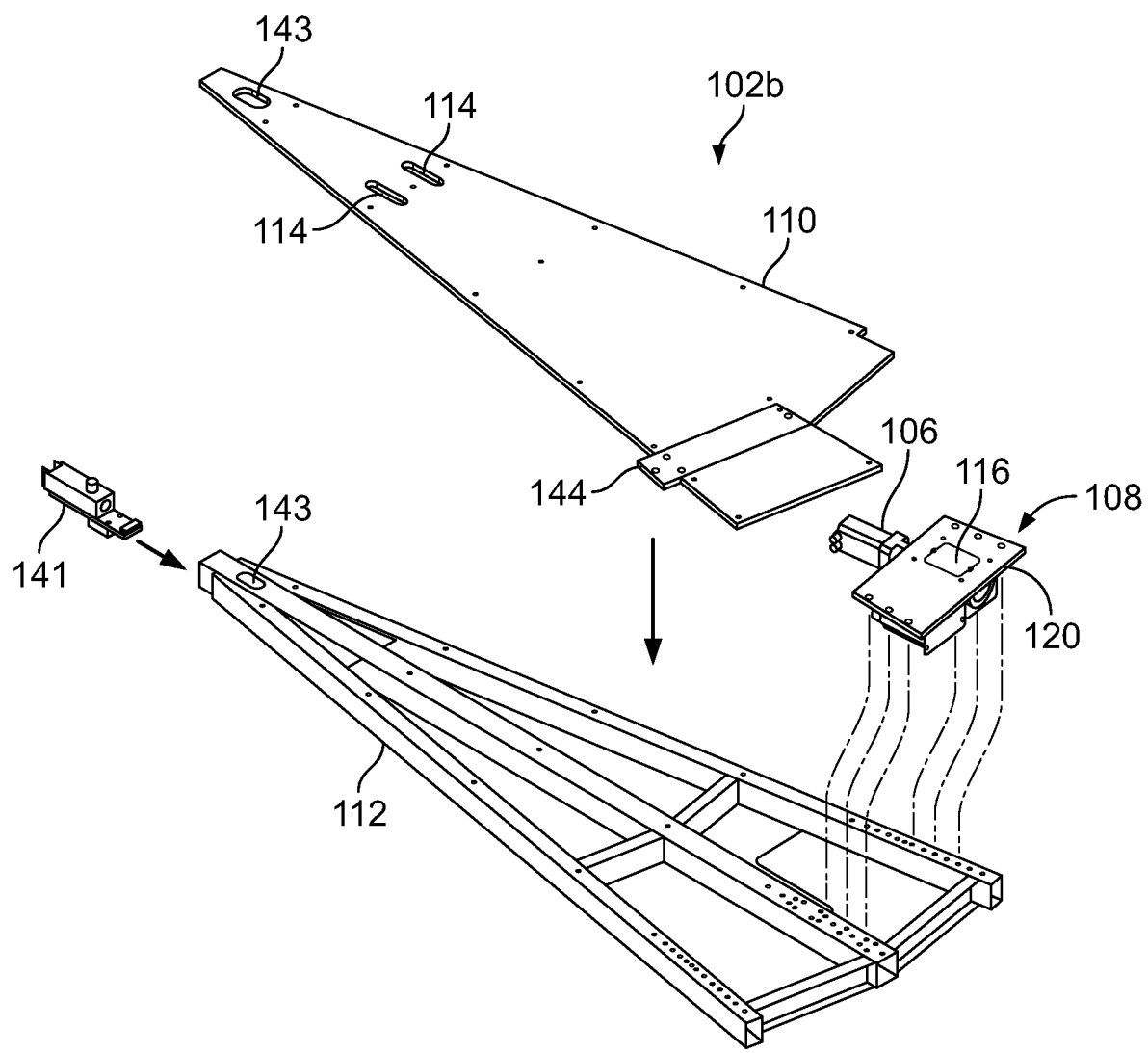
FIG. 3 is a partially-exploded, front perspective view of an example second wedge-shaped panel of the vehicle turntable shown in FIG. 1, in accordance with embodiments.
Figure 4:
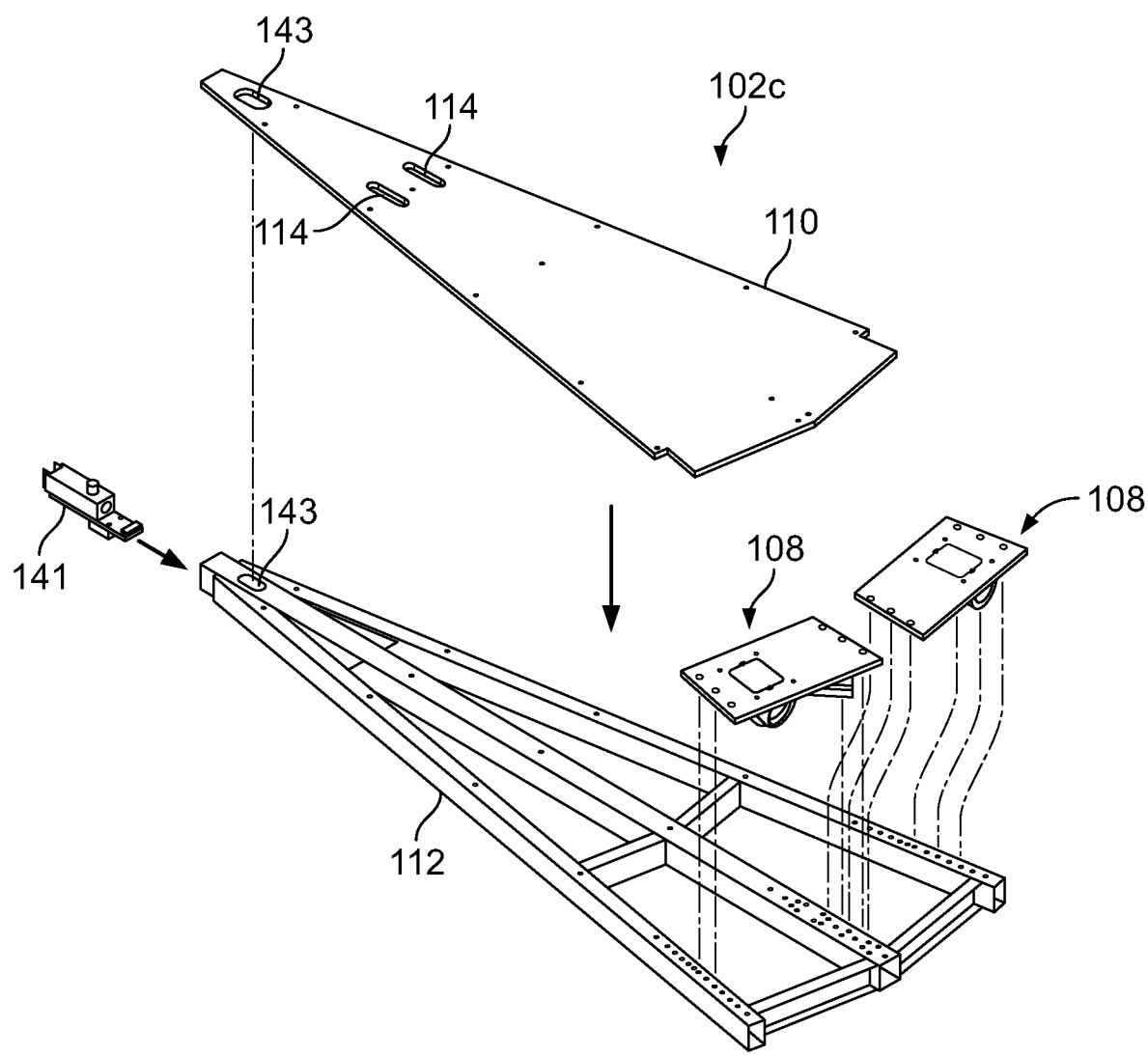
FIG. 4 is a partially-exploded, front perspective view of an example third wedge-shaped panel of the vehicle turntable shown in FIG. 1, in accordance with embodiments.
Figure 5:
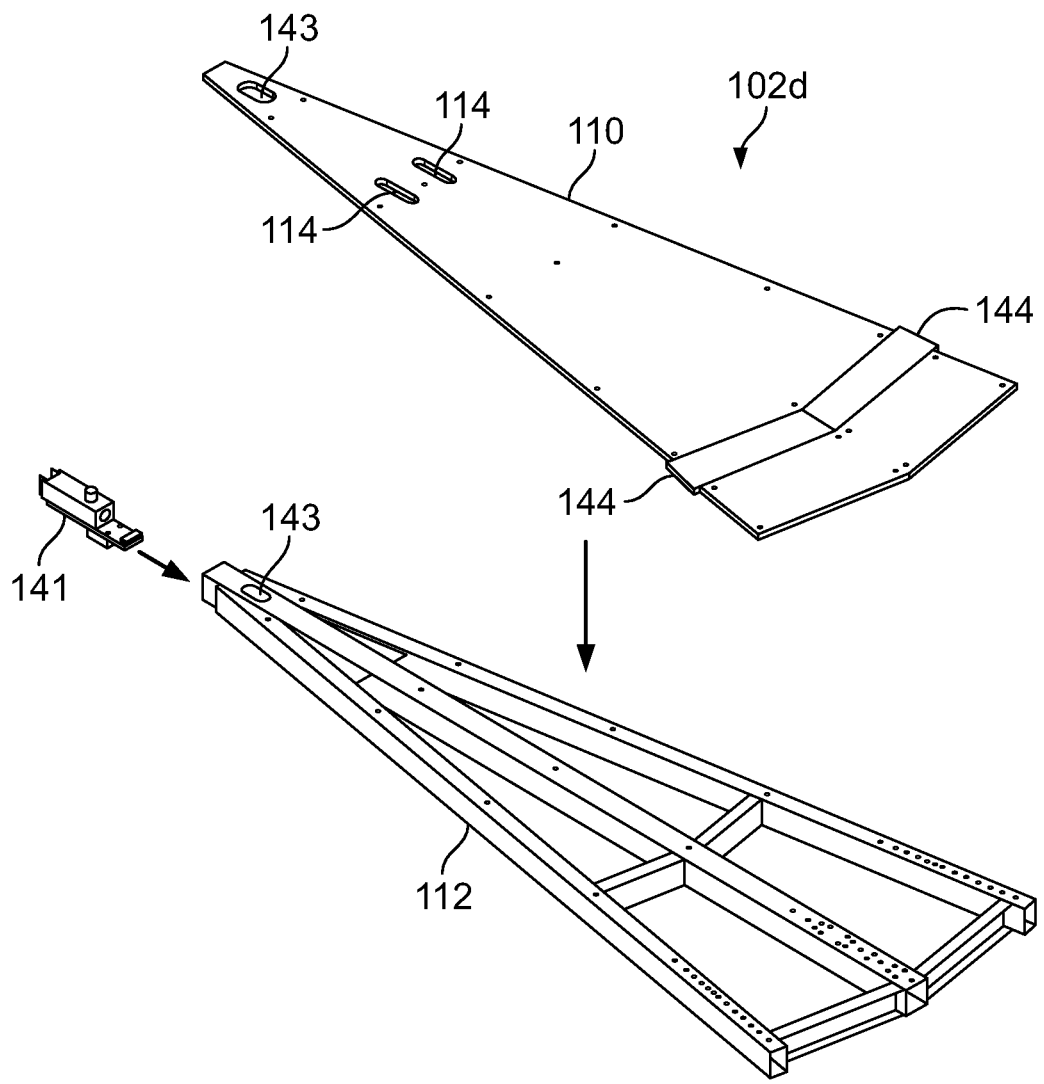
FIG. 5 is a partially-exploded, front perspective view of an example fourth wedge-shaped panel of the vehicle turntable shown in FIG. 1, in accordance with embodiments.

Referring additionally to FIGS. 2 through 5, shown are four different types of wedge-shaped panels 102 that may be included in the vehicle turntable 100, in accordance with embodiments. FIG. 2 depicts an example passive panel 102a, which includes a single wheel assembly 108 and no motor. FIG. 3 depicts an example motorized panel 102b, which includes one of the motors 106 and a single wheel assembly 108. FIG. 4 depicts a base panel 102c, which is configured to be placed first when assembling the turntable 100 and includes two wheel assemblies 108. FIG. 5 depicts a bridge panel 102d, which is configured to be placed last when assembling the turntable 100 and includes zero wheels. In embodiments, a majority (e.g., thirteen) of the eighteen panels 102 may be passive panels 102a, while only three may be motorized panels 102b, for example, as shown in FIG. 1. As will be appreciated, the exact number of passive and motorized panels may vary depending on the number of motors 106 and the total number of panels 102 included in the turntable 100.

As also shown in FIGS. 2-5, each panel 102 includes a top cover portion 110 attached to an underlying frame portion 112. The cover portion 110 can be made of a plywood skin, wood paneling, or other suitable material capable of providing a hard covering for the frame portion 112. The frame portion 112 can be made of aluminum or other suitable, lightweight material capable of supporting the weight of the turntable 100. Each panel 102 can include one or more handholds 114 within the cover portion 110 for use when carrying and/or installing the panels 102. For example, in the illustrated embodiment, a pair of adjacent handholds 114 are integrated into or carved out of the cover portion 110 so that the top surface of the panel 102 remains level.

Figure 6A:
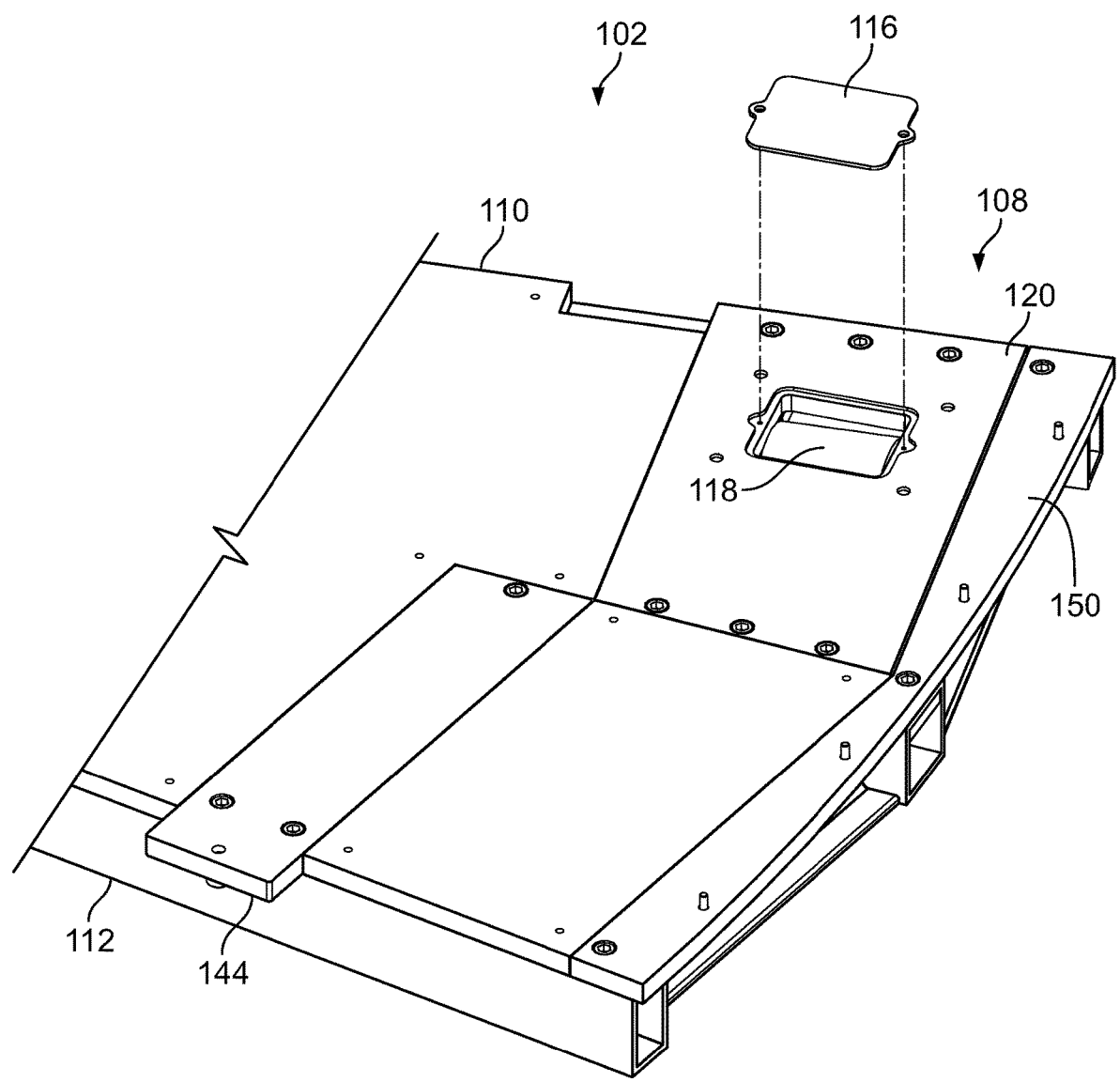
FIG. 6A is a partially-exploded, top perspective view of a portion of an example wedge-shaped panel of the vehicle turntable shown in FIG. 1, in accordance with embodiments.

In addition, the cover portion 110 can have one or more removable sections to provide easy access to components located below the cover portion 110 without removing the entire panel 102 or otherwise disassembling the turntable 100. For example, the removable sections can be configured to provide access to the motors 106 in the motorized panels 102b and/or the wheel assemblies 108 in the passive panels 102a, the motorized panels 102b, and the base panel 102c. FIG. 6A shows one example embodiment of a wheel access panel 116 that can be removed to provide access to a wheel 118 located directly below it. The wheel access panel 116 may be sized and shaped to allow inspection, repair, and/or removal of the wheel 118 without removing any other portion of the panel 102.

Figure 6B:
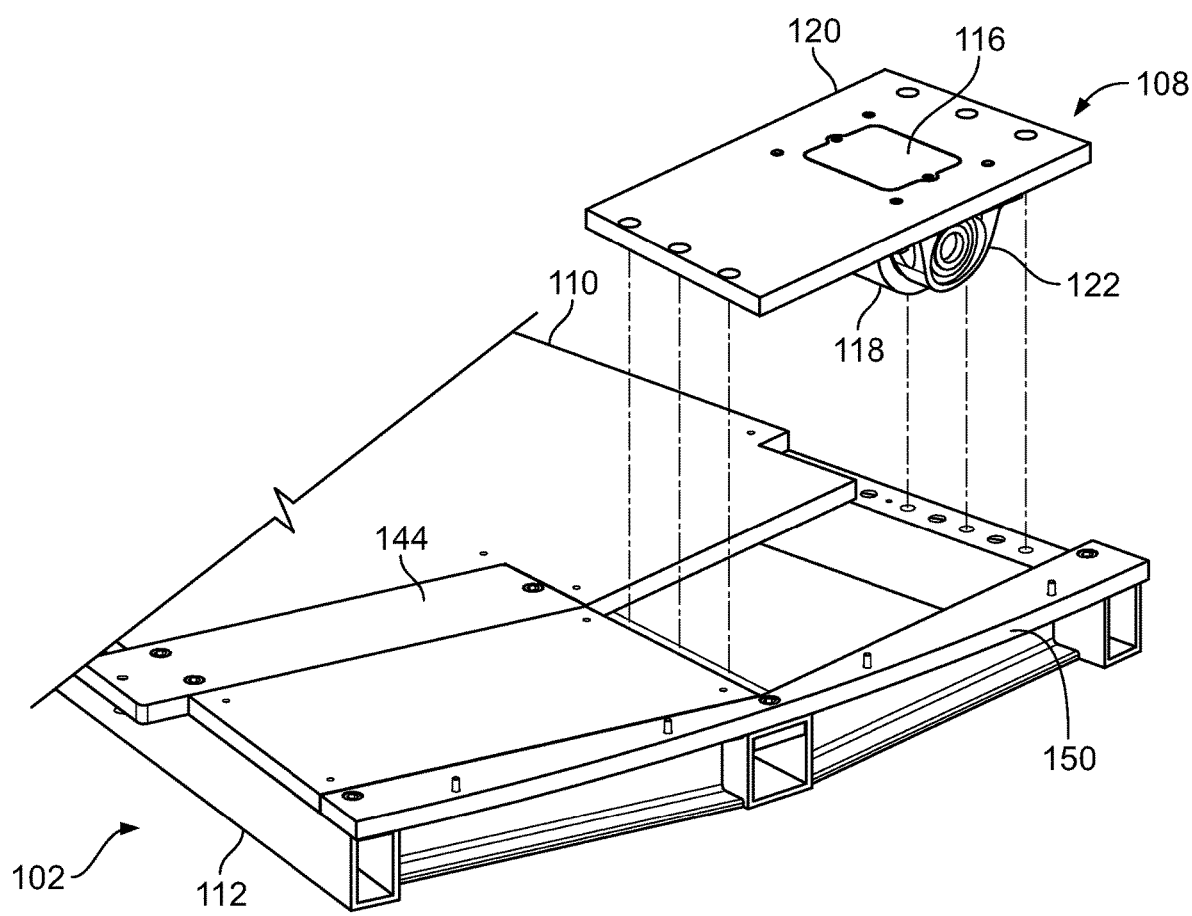
FIG. 6B is another partially-exploded, top perspective view of the portion of the wedge-shaped panel shown in FIG. 6A, in accordance with embodiments.
Figure 6C:
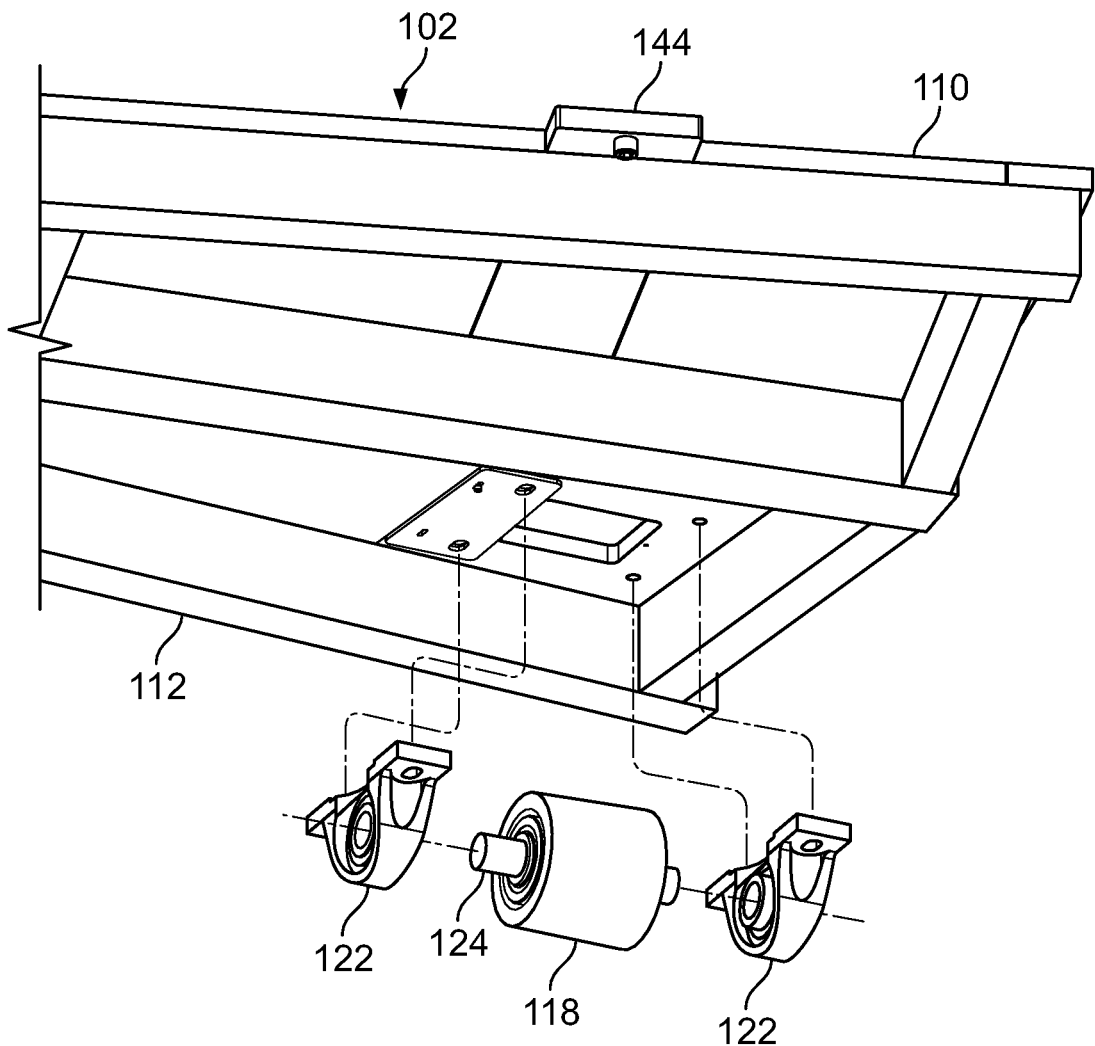
FIG. 6C is a partially-exploded, bottom perspective view of the portion of the wedge-shaped panel shown in FIG. 6A, in accordance with embodiments.

Referring additionally to FIGS. 6B and 6C, shown is an example wheel assembly 108 comprising the wheel access panel 116, the wheel 118, and other components related to the wheel 118. More specifically, as shown in FIG. 6B, the wheel assembly 108 also includes a wheel plate 120 configured to attach the wheel assembly 108 to the frame 112, for example, using bolts or other fasteners. If a particular wheel 118 requires servicing, the wheel assembly 108 may be removed from the panel 102 by removing the bolts in the wheel plate 120 and lifting the wheel assembly 108 out. The wheel plate 120 may be comprised of aluminum or other suitable material and may be configured to be level with the cover portion 110 once installed. FIG. 6C depicts an underside of the panel 102 to show the remaining components of the wheel assembly 108. As illustrated, the wheel assembly 108 further includes a pair of pillow block bearings 122 for supporting a rotating shaft 124 extending through a center of the wheel 108. The pillow block bearings 122 are mounted to an underside of the wheel plate 120 and positioned on either side of the wheel 118, so that the wheel 118 can rotate on the shaft 124 positioned between the bearings 120.

In embodiments, the wheel assemblies 108 of the turntable 100 can be configured to operate as idle wheel assemblies or driven wheel assemblies depending on whether the wheel assembly 108 is included in a passive panel 102a or a motorized panel 102b. More specifically, in each of the motorized panels 102b, the wheel assembly 108 can be coupled to the motor 106 included therein, as shown in FIG. 3, and can operate as a driven wheel assembly when the motor 106 is engaged. Each driven wheel assembly can be configured to cause rotation of the turntable 100. For example, the motor 106 can be coupled to the rotating shaft 124 and can be configured to drive the wheel 118 by causing rotation of the rotating shaft 124. Rotation of the driven wheel can cause the entire turntable 100 to move. If the motor 106 is not engaged, the wheel assembly 108 attached thereto can operate as an idle wheel assembly. The wheel assemblies 108 included in the passive panels 102a and the base panel 102c also operate as idle wheel assemblies. The wheels 118 in the idle wheel assemblies carry the turntable 100 around as the driven wheel assembly 108 drives the rotation. In embodiments, the wheels 118 of the idle wheel assemblies keep rotating as long as the turntable 100 is moving and stop rotating when the turntable 100 stops moving.

Figure 7:
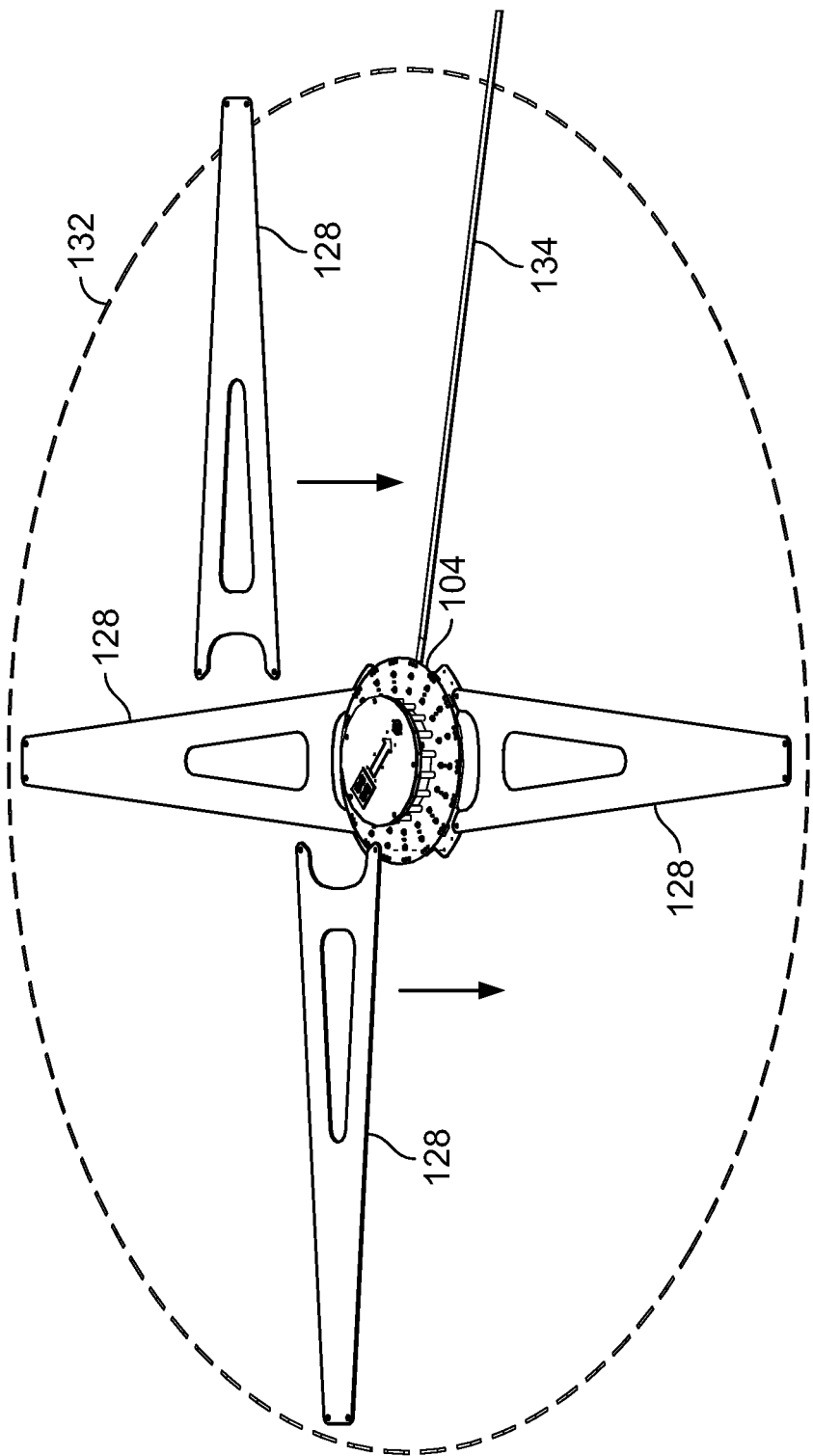
FIG. 7 is a partially-exploded, front perspective view of the vehicle turntable shown in FIG. 1 during an exemplary first stage of assembly, in accordance with embodiments.
Figure 8:
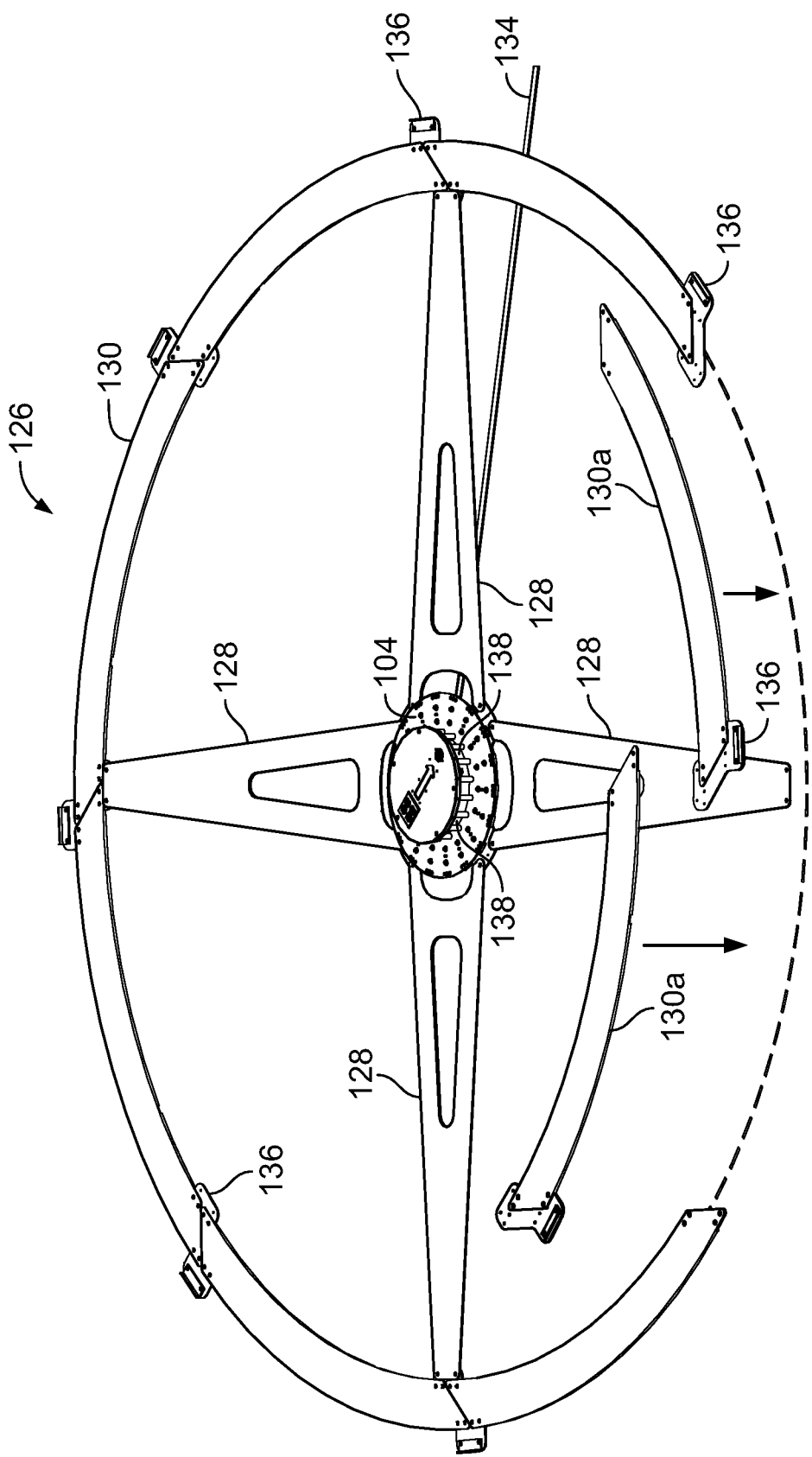
FIG. 8 is a partially-exploded, front perspective view of the vehicle turntable shown in FIG. 1 during an exemplary second stage of assembly, in accordance with embodiments.

Referring additionally to FIGS. 7-12, shown are example stages during assembly of the turntable 100 at an intended location. FIGS. 7 and 8 depict two initial stages during which a frame assembly 126 can be installed on a floor of the intended turntable location, centered around the central hub 104. In embodiments, the frame assembly 126 can include a plurality of spreaders 128 (also referred to therein as "support plates") and a track 130. Prior to installing the frame assembly 126, the central hub 104 may be positioned over a central point of the intended turntable location and an outline 132 demarking an intended perimeter of the turntable 100 may be drawn. Then, as shown in FIG. 7, four spreaders 128 can be attached to top, bottom, left, and right sides of the central hub 104, respectively, using bolts or other fasteners. In embodiments, each of the spreaders 128 can have a uniform size and shape to facilitate storage when disassembled and to eliminate guessing during assembly. For example, a length of the spreaders 128 can be fixed based on a diameter of the turntable 100, and the spreaders 128 can be interchangeable during assembly.

Next, as shown in FIG. 8, the track 130 can be assembled along the outline 132. The track 130 can have a smooth upper surface configured to enable the wheels 118 to glide along the track 130. The track 130 can be made up of a plurality of arc-shaped sections 130a that are attached to each other along connection plates 136 using bolts or other fasteners during assembly. As illustrated, four of the connection plates 136 are also attached to the spreaders 128, thus securing the track 130 to the spreaders 128. As shown in FIGS. 7 and 8, a cable 134 extends out from the central hub 104 and runs underneath the spreaders 128 and the track 130, out towards a control box (see, e.g., control box 152 in FIG. 20). The cable 134 may be a flat cable and may be configured to carry data, power, and/or control signals between the central hub 104 and the control box.

Figure 9:
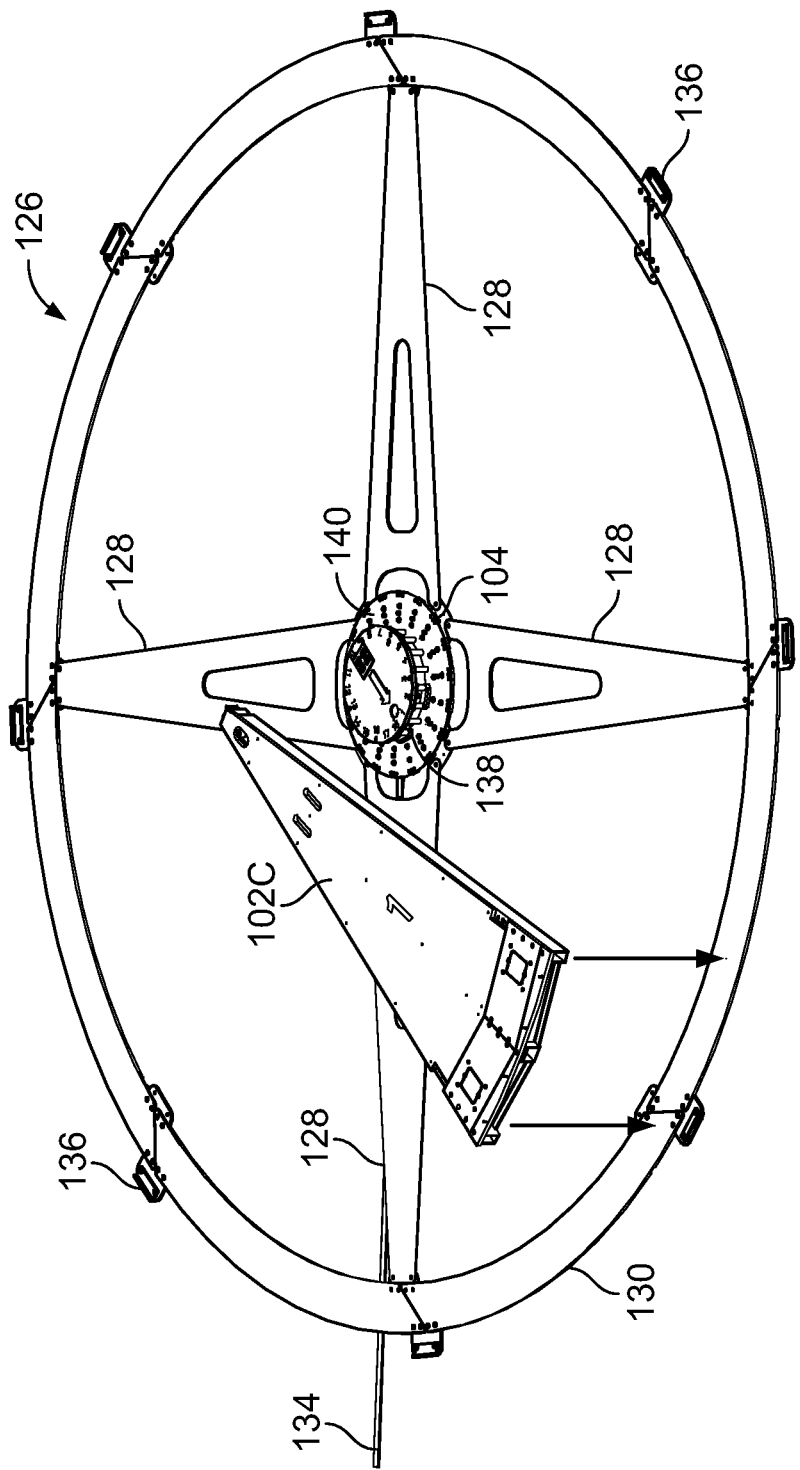
FIG. 9 is a partially-exploded, front perspective view of the vehicle turntable shown in FIG. 1 during an exemplary third stage of assembly, in accordance with embodiments.
Figure 10:
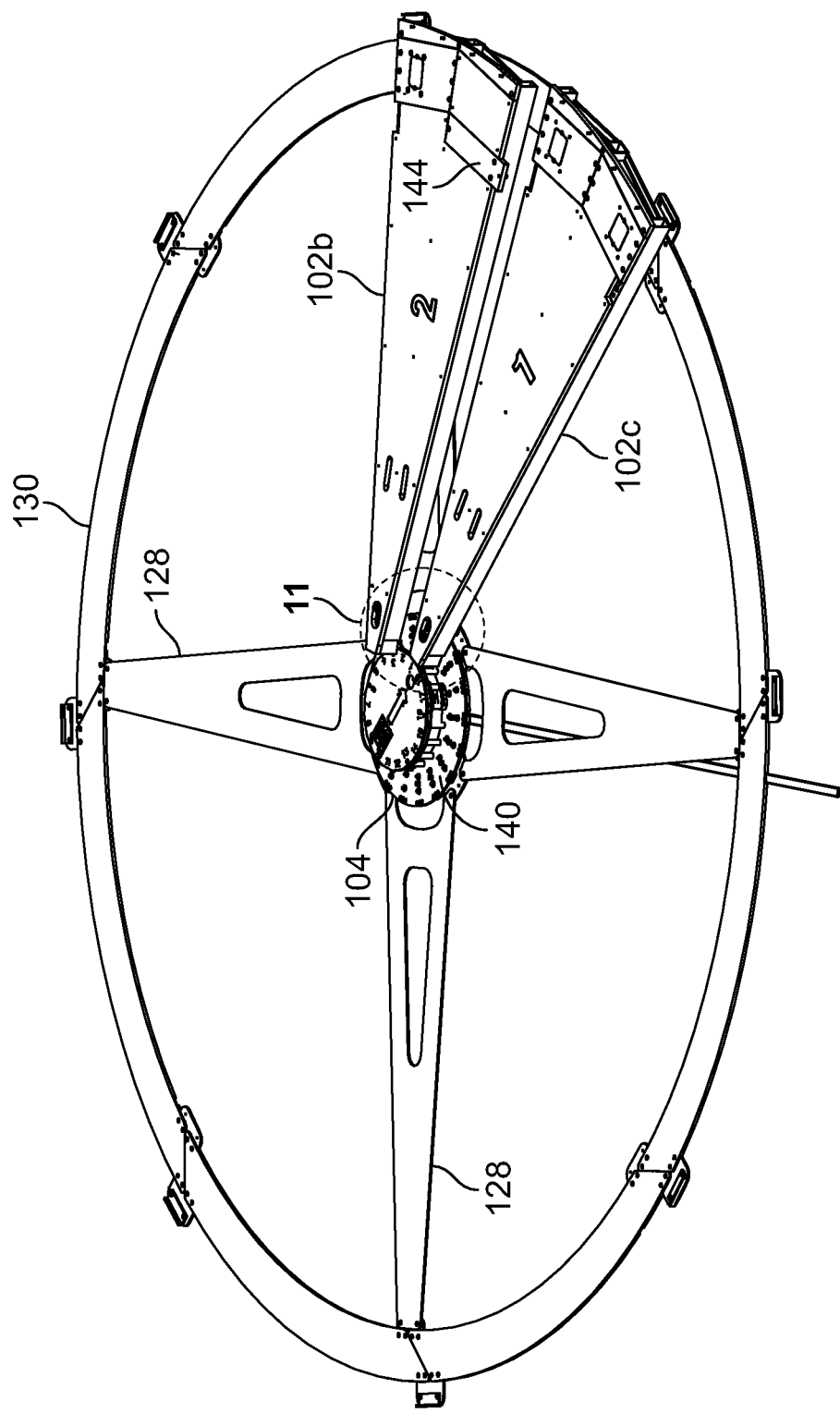
FIG. 10 is a partially-exploded, front perspective view of the vehicle turntable shown in FIG. 1 during an exemplary fourth stage of assembly, in accordance with embodiments.
Figure 11:
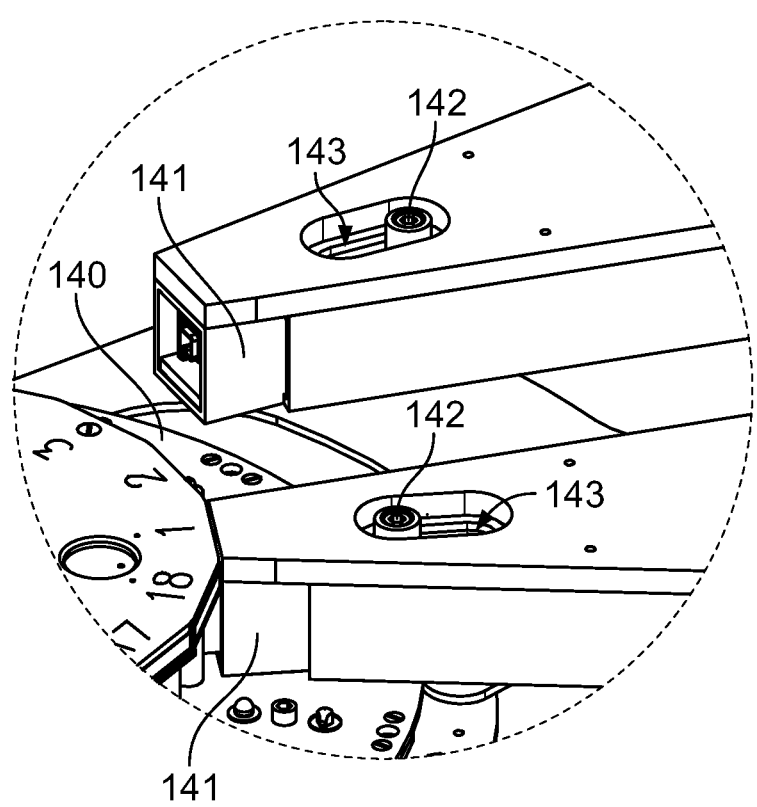
FIG. 11 is a partial, close-up view of the vehicle turntable shown in FIG. 1 during an exemplary fifth stage of assembly, in accordance with embodiments.

Once the hub 104, spreaders 128, and track 130 are in place, the panels 102 can be radially arranged along the track 130 and coupled to a plurality of attachment ports 138 included in the central hub 104, as shown in FIGS. 9, 10, and 11. In embodiments, each panel 102 can include a connector 141 at a front end of the panel 102, and the connector 141 can be configured to slide into the corresponding attachment port 138. The attachment ports 138 can be located in a base 140 of the central hub 104. Each panel 102 can be further secured to the hub 104 by coupling a bolt 142 or other fastener to the base 140 through a slot 143, as shown in FIG.

11. The base 140 can be configured to operate as a slew bearing that enables the bolted ends of the panels 102 to rotate as the far ends of the panels 102 move along the track 130.

Figure 13:
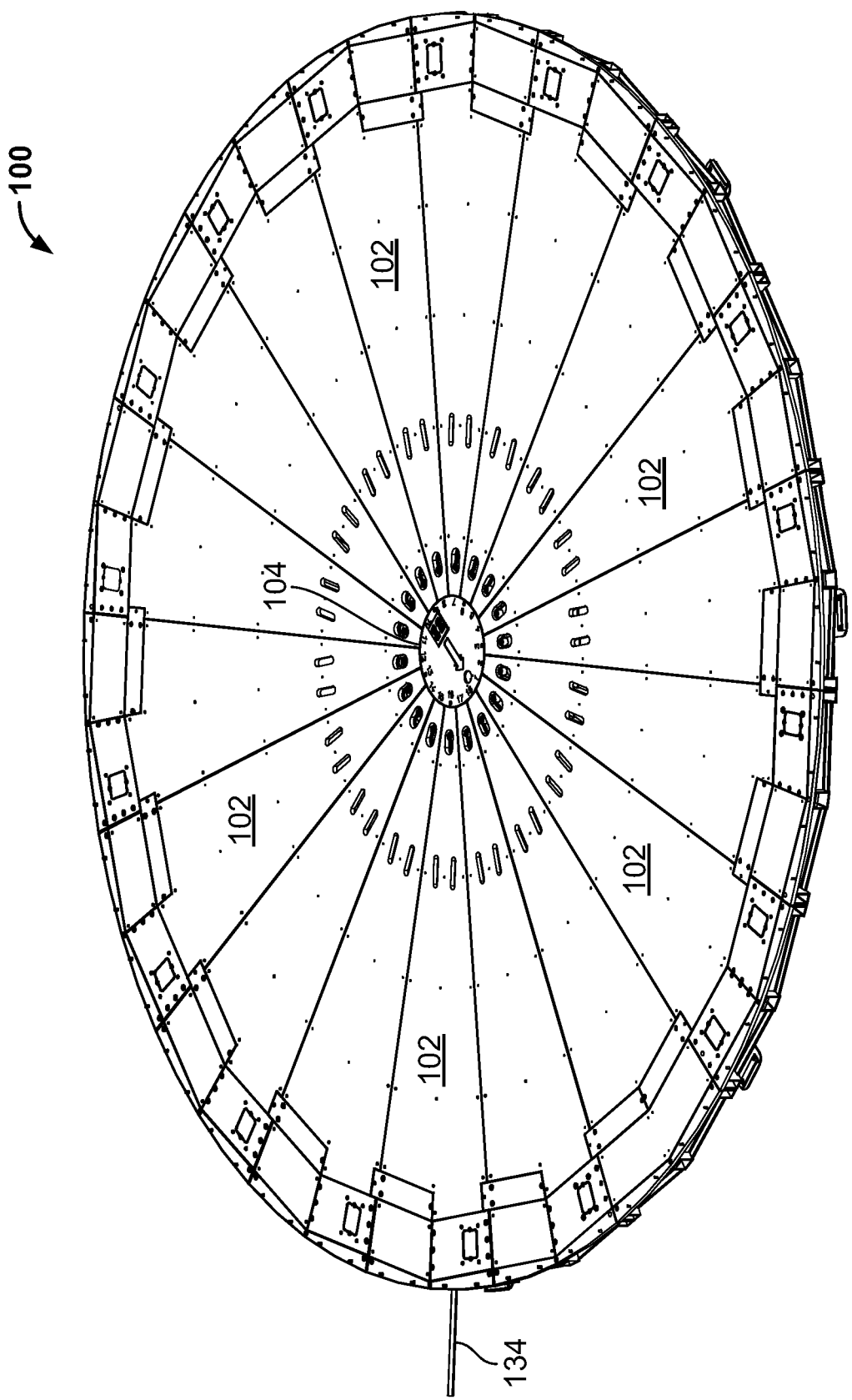
FIG. 13 is a perspective view of the vehicle turntable shown in FIG. 1, in accordance with embodiments.

As shown in FIG. 1, each of the panels 102 may be associated with a number that determines the order of its placement during assembly of the turntable 100. For example, as shown in FIG. 9, the base panel 102c can be the first panel to be installed onto the central hub 104, and one of the motorized panels 102b can be the second panel to be installed, as shown in FIG. 10. The remaining panels 102 may continue to be consecutively installed around the central hub 104, with the bridge panel 102d being installed last, until all eighteen panels have been placed onto the track 130, as shown in FIGS. 1 and 13. In some cases, the central hub 104 includes corresponding numbers adjacent to the attachment ports 138 to help the installer align the panels 102 to the appropriate ports 138, as shown in FIGS. 9 and 11.

In embodiments, each pair of adjacent panels 102 can be coupled to each other using one or more bridge plates 144 transversely positioned across at least a portion of each adjacent panel 102 and bolted or fastened on each end to one of the adjacent panels 102, as shown in FIG. 1. The bridge plates 144 can be configured to tie the components of the turntable 100 together into one cohesive unit and to transfer a weight of the panels 102 to the wheels 118, so that the turntable 100 carries its weight evenly with minimal weak spots. In embodiments, the bridge plates 144 can be installed as adjacent panels 102 are placed next to each other, or after all of the panels 102 have been placed onto the track 130. The bridge plates 144 can be rectangular bars made of aluminum or other suitable material and/or shape capable of securing the panels 102 to each other.

In the illustrated embodiment (e.g., as shown in FIGS. 1, 2, and 3), each of the passive panels 102a and motorized panels 102b includes a single bridge plate 144 configured to be attached to the neighboring panel that is adjacent to a first predetermined side of the panel 102. For example, as shown in FIG. 12A, the bridge plate 144 extends out from a left edge of the panel 102b for attachment to the left neighboring panel 102a. In addition, each of the passive panels 102a and motorized panels 102b includes a groove 146 configured to receive the bridge plate 144 extending out from the neighboring panel that is adjacent to a second predetermined side of the panel 102, the second predetermined side being opposite the first predetermined side. For example, as shown in FIG. 12A, the panel 102a includes the groove 146 on its right edge to receive the bridge plate 144 extending from the right neighboring panel 102. As shown in FIG. 12B, the extended portion of the bridge plate 144 can include a steel dowel 144a or other extension configured for attachment to the groove 146, and the groove 146 can include an aperture 146a configured to receive the steel dowel 144a. As will be appreciated, in other embodiments, the bridge plates 144 may be attached to neighboring panels 102 using other known mechanical fasteners.

In the illustrated embodiment (e.g., as shown in FIGS. 1 and 4), the base panel 102c does not include any bridge plates but does include two grooves 146 on either side of the panel 102c for receiving a bridge plate 144 from each neighboring panel 102. When the bridge plates 144 of the neighboring panels 102 are attached to the base panel 102c, the weight of those panels 102 is at least partially transferred to the base panel 102c through the bridge plates 144. To help carry this weight, the base panel 102c includes two idle wheel assemblies 108, as shown in FIG. 4.

As also illustrated (e.g., as shown in FIGS. 1 and 5), the bridge panel 102d includes a bridge plate 144 on either side of the panel 102d for coupling to each neighboring panel 102. When the bridge plates 144 of the bridge panel 102d are coupled to its neighboring panels 102, the entire turntable structure becomes locked together. Because the bridge panel 102d includes no wheels, the bridge plates 144 operate to transfer the weight of the bridge panel 102d to the wheels 118 on its neighboring panels 102, including the base panel 102a.

FIG. 13 depicts the turntable 100 in a finished state, in accordance with embodiments. In some cases, an additional flooring cover may be placed on top of the top cover 110 of each panel 102 to hide the handholds 114, the central hub 104, the bolts 142, the bridge plates 144, and/or the wheel plates 120, and to provide a more continuous or fluid finish to the top surface of the turntable 100. As an example, the additional flooring may be wood paneling, aluminum, or any other material depending on a desired finish for the turntable 100. In embodiments, the turntable 100 can be configured to have a low profile with a height of approximately 5.25 inches. In some cases, the turntable 100 may be positioned on top of risers (not shown) in order to elevate the turntable 100 to a predetermined height. In such cases, the risers may be placed first, under the frame assembly 126 and the central hub 104.

Figure 14B:
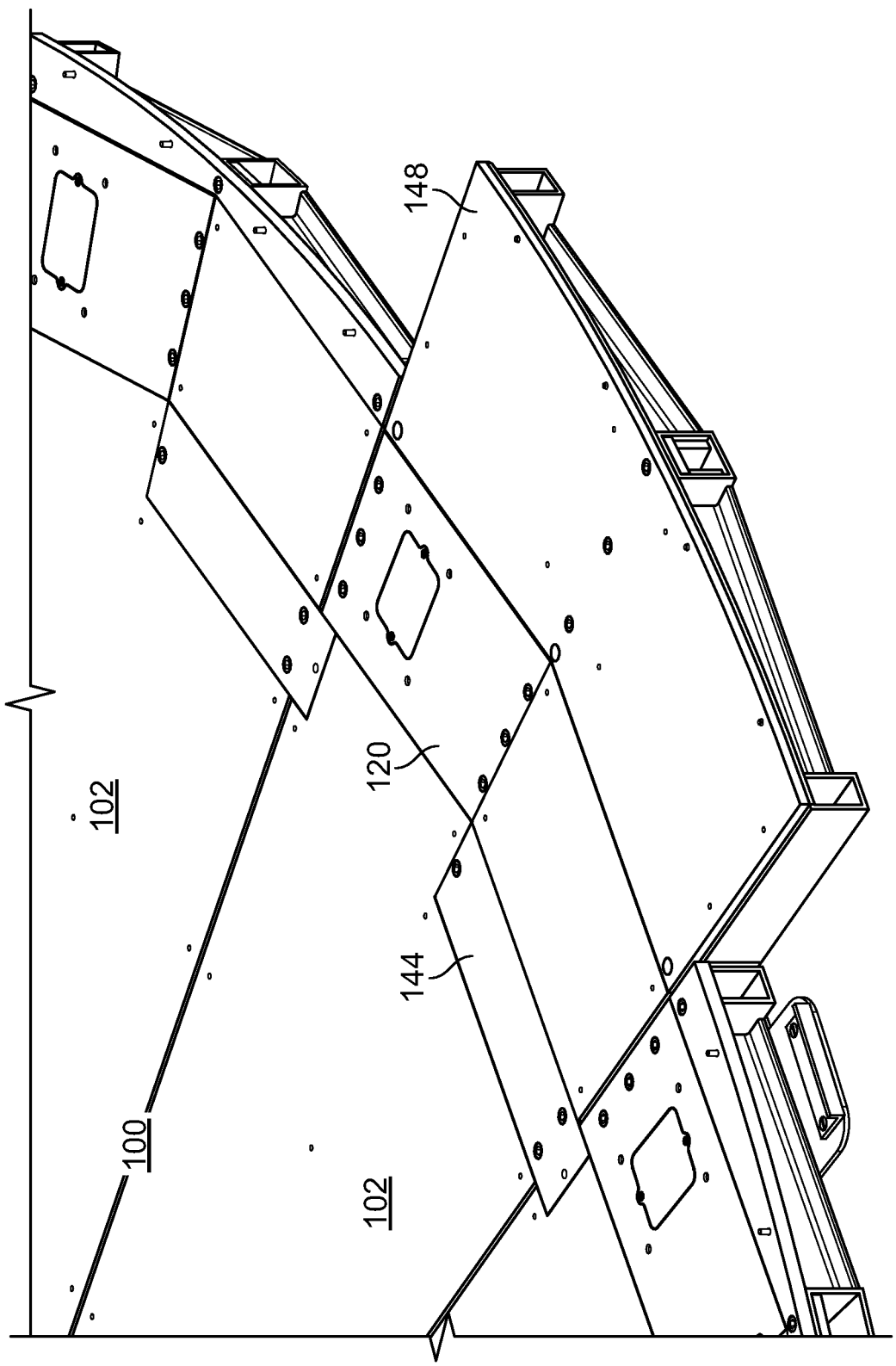
FIG. 14B is a top perspective view of the extender coupled to the portion of the outer edge shown in FIG. 14A, in accordance with embodiments.

In embodiments, the turntable 100 is configured to have an original diameter of eighteen feet, which can be extended to a diameter of twenty feet by adding a twelve inch extender 148 to the end of each panel 102, as shown in FIGS. 14A and 14B. The extender 148 can be attached by removing a trim piece 150 from the end of the panel 102 and sliding a connector 148a of the extender 148 into an opening 152 located at the edge of each panel 102, as shown in FIG. 14A. The extender 148 can have an overhang 148b that is configured to slide over the edge of the panel 102, fit flush against the panel 102, and be bolted or fastened to the panel 102 at the same location as the trim piece 150, as shown in FIG. 14B.

Figure 15:
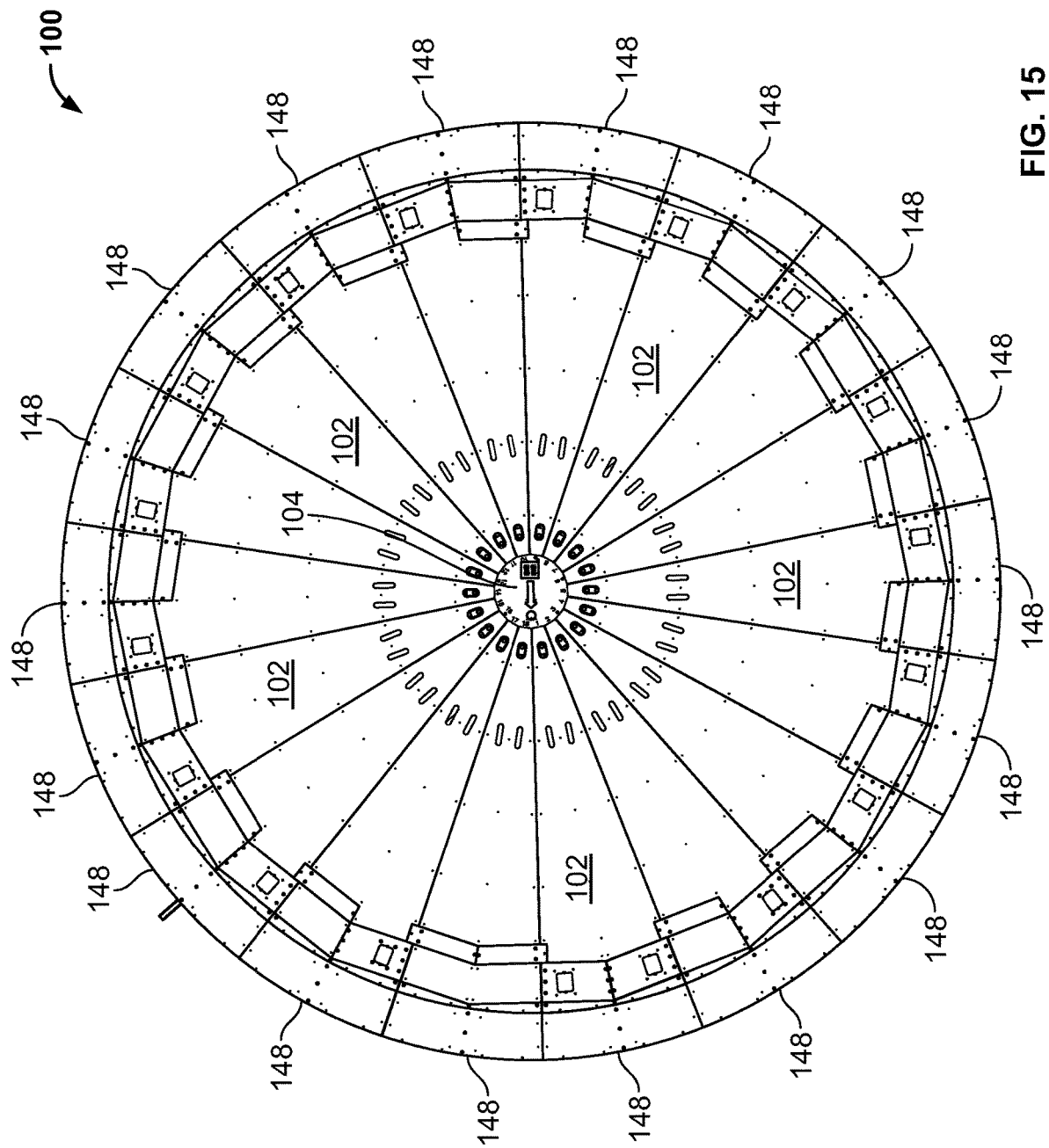
FIG. 15 is a top plan view of the vehicle turntable shown in FIG. 1 with extenders installed all around the perimeter, in accordance with embodiments.

FIG. 15 depicts the turntable 100 with extenders 148 attached to each panel 102, so that the entire turntable 100 is extended to a diameter of twenty feet. By providing the option of adding extenders 148 to extend the turntable diameter, the same original turntable 100 can be used in various scenarios or for different sized vehicles, regardless of the final diameter required. In other embodiments, the turntable 100 can have a different original diameter (e.g., twenty feet), and the extenders 148 can be configured to extend the turntable diameter to a different extended diameter (e.g., twenty-two feet). In some embodiments, the extenders 148 can be made in different sizes to provide additional size extension options (e.g., two feet, three feet, etc.).

FIGS. 16 through 18 depict a storage unit or cart 200 for storing and transporting the disassembled components of the turntable 100. The storage unit 200 can have side doors 202 on all four sides of the unit 200, as shown in FIG. 16. The side doors 202 can be configured to slide or fold open. FIG. 17 shows an inside of the storage unit 200 with the side doors 202 removed. The inside includes a plurality of shelves 204 for storing various components of the turntable 100. For example, in FIG. 17, the shelves 204 are holding the wedge-shaped panels 102 of the turntable 100. In some embodiments, the storage units 200 can be stackable, for example, so that one unit 200 can stack on top of another unit 200. The storage unit 200 can be made of steel or other suitable material.

Figure 18A:
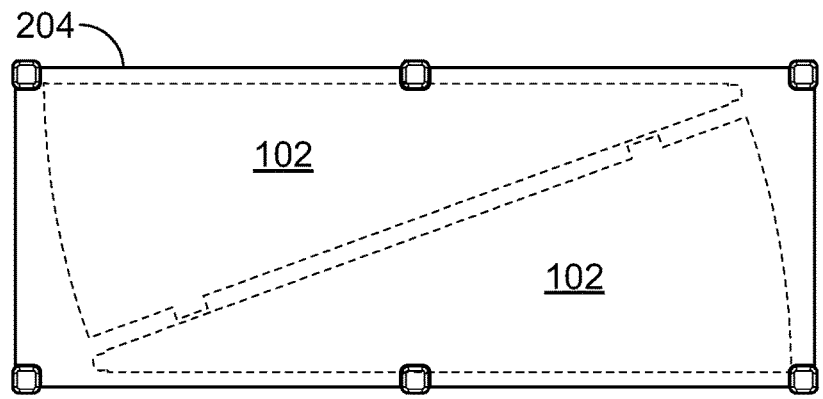
FIG. 18A is a top plan view of one example shelf of the storage crate shown in FIG. 16, in accordance with embodiments.
Figure 18B:
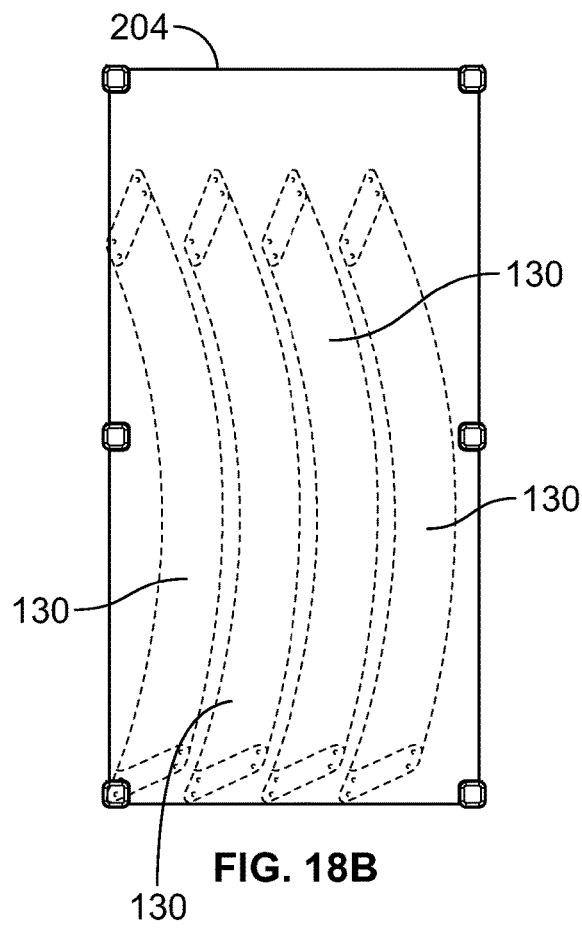
FIG. 18B is a top plan view of another example shelf of the storage crate shown in FIG. 16, in accordance with embodiments.
Figure 18C:
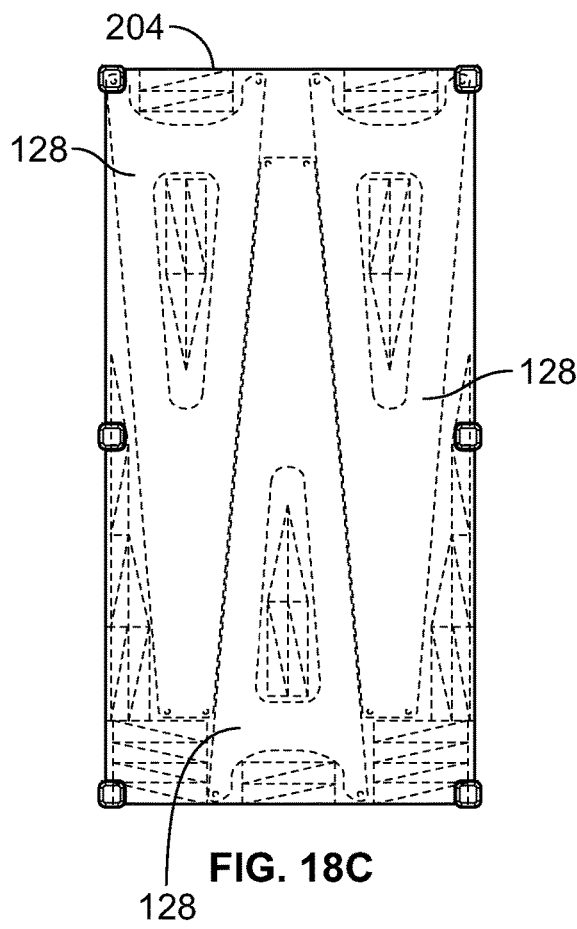
FIG. 18C is a top plan view of still another example shelf of the storage crate shown in FIG. 16, in accordance with embodiments.

The shelves 204 may be sized and shaped to hold a certain configuration of the panels 102 and/or the other components of the turntable 100, in order to maximize storage space usage. For example, FIG. 18A shows an example layout for placing two panels 102 on a single shelf 204. As shown, the panels 102 fit onto the shelf 204 when placed side by side but facing opposite directions. As another example, FIG. 18B shows an example layout for placing four track sections 130a onto a single shelf 204. As shown, the track sections 130a fit onto the shelf 204 when placed side by side in a piggy-back configuration. As another example, FIG. 18C shows an example layout for placing three spreaders 128 onto a single shelf 204. As shown, the spreaders 128 fit onto the shelf 204 when placed side by side but facing alternating directions, so that the middle spreader 128 is sandwiched between the other two spreaders 128. As will be appreciated, other configurations may be possible for fitting the turntable components onto the shelves 204 of the storage unit 200.

Figure 20:
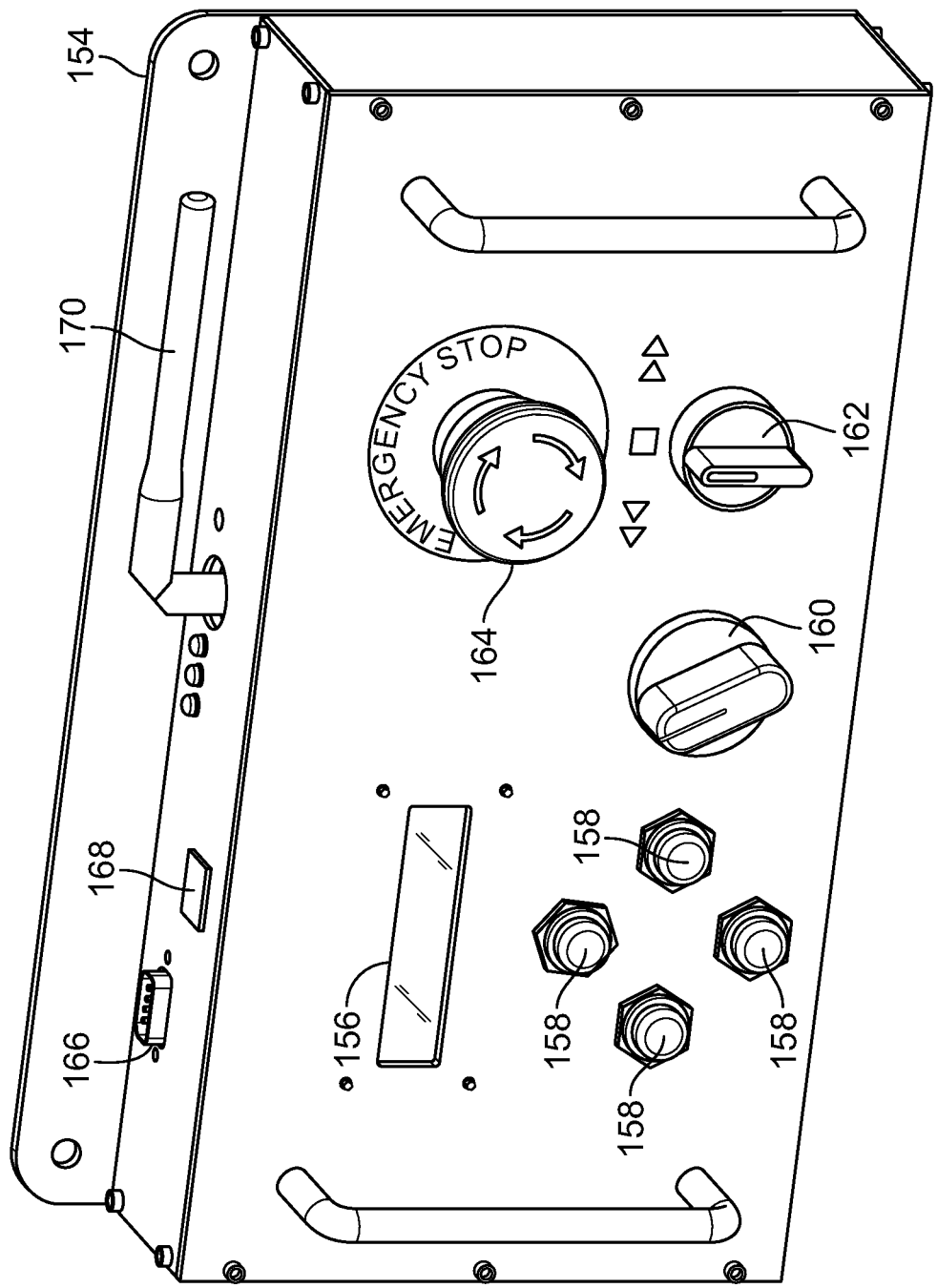
FIG. 20 is a detailed view of the remote control unit shown in FIG. 19, in accordance with embodiments.

According to embodiments, the turntable 100 can be configured to receive control signals from and/or transfer data to a remote control unit (such as, e.g., remote control unit 154 shown in FIG. 20) for controlling and/or monitoring various parameters of the turntable 100. The turntable 100 can be coupled to the remote control unit via wired connection, such as the cable 134, or a wireless connection (e.g., as shown in FIG. 21). In embodiments, the remote control unit can be configured for manual control, for example, via user controls included on a surface of the control unit (e.g., as shown in FIG. 20) and/or software-based control, for example, through data packets received from a central controller or software executed by a processor included in the remote control unit, as described in more detail below.

The central hub 104 can include circuitry (not shown) for receiving control signals from the remote control unit, providing the control signals to the motors 106, and/or otherwise controlling operation of the motors 106. For example, in some cases, the circuitry includes the position sensor and controller for controlling operation of the servo-motors 106, as described above. Wires or cables (not shown) may run from the central hub 104 to each motor 106, for example, through the frame portion 112 of each motorized panel 102b, to convey the control signals to the motors 106. In some cases, the connectors 141 of the motorized panels 102b can be configured to electrically connect to the attachment ports 138 of the central hub 104, and the connectors 141 can be electrically coupled to the motors 106 in order to transfer data and/or power between the central hub 104 and the motors 106. The circuitry within the central hub 104 may also include one or more processors or microprocessors for monitoring and/or controlling the overall operation of the turntable 100, processing data and/or control signals received from the remote control unit, and/or communicating data to the remote control unit.

In embodiments, the central hub 104 includes a rotating electrical connector (not shown), such as, for example, a Mercotac® connector, for electrically coupling the cable 134 to the central hub 104. The rotating connector may be a mercury collector ring that provides reduced friction and noise during operation, and increased overall reliability and serviceability, as compared to a conventional slip ring. In embodiments, the rotating connector may include a substantially cylindrical portion positioned upright within the central hub 104, with the cable 134 electrically coupled to a bottom end of the rotating connector and wire connections from the circuitry of the central hub 104 electrically coupled to a top end of the rotating connector. The cylindrical portion of the rotating connector comprises a brushless slip ring that forms the electrical connection through two rotating pieces inside the cylinder. This allows the cylindrical portion of the rotating connector to rotate while the electrical connections at the top and bottom ends remain securely coupled to respective cables or wires.

Figure 19:
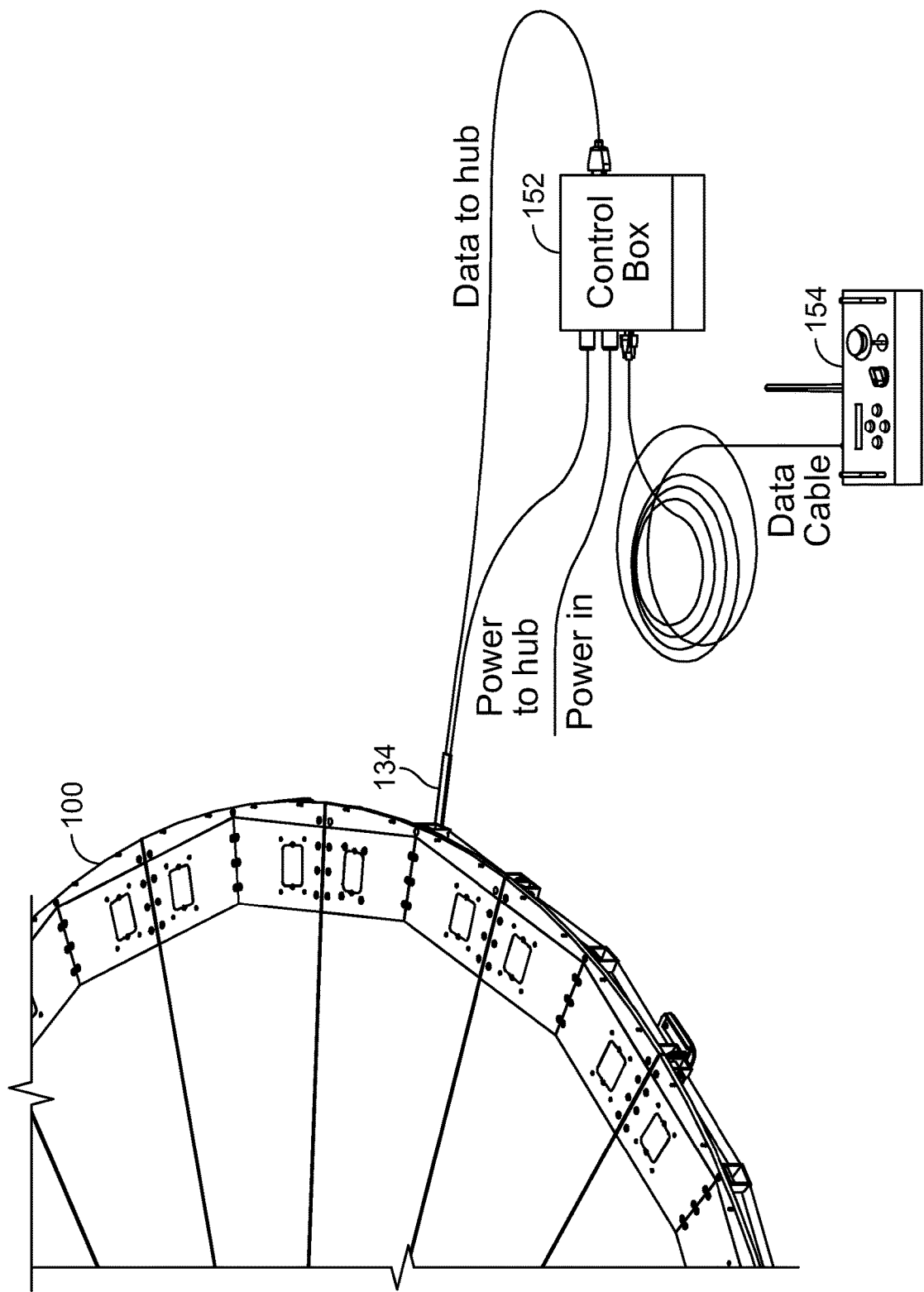
FIG. 19 is a partial perspective view of the vehicle turntable shown in FIG. 1 coupled to an example control box and an example remote control unit, in accordance with embodiments.

FIG. 19 depicts an example control box 152 that can be electrically coupled to the cable 134 of the turntable 100. The control box 152 can be included in the turntable 100, or positioned at a distance away from the turntable 100, as shown in FIG. 19. In embodiments, the control box 152 can be configured to provide power to the components of the turntable 100, including the central hub 104 and/or the motors 106, to transfer data and/or control signals to the central hub 104, and to receive data from the central hub 104. As shown, the control box 152 can be communicatively coupled to a remote control unit 154 configured to receive user-selected control settings for the turntable 100. The remote control unit 154 can transmit the user-selected control settings to the control box 152 as control signals, and the control box 152 can provide the control signals to the central hub 104 for controlling operation of the turntable 100. In the illustrated embodiment, the remote control unit 154 is coupled to the control box 152 via a data cable, and the control box 152 is coupled to the turntable 100 via the cable 134 that is electrically connected to the central hub 104. In other embodiments, one or more of these wired connections can be implemented using a wireless connection, for example, as shown in FIG. 21 and discussed in more detail below.

FIG. 20 depicts an example embodiment of the remote control unit 154 configured to enable user control of the turntable 100. As shown, the remote control unit 154 can include a display screen 156 for displaying a real-time or live status of the turntable 100, menu options for navigating a menu interface, control settings and other parameters selected for the turntable 100, and other data associated with control of the turntable 100. According to embodiments, the real-time status or feedback information displayed on the display screen 156 can include a current rotational speed of the turntable 100, a current rotational position of the turntable 100, a current incoming data packet count, and a current IP address of the control unit 154. In some cases, the display screen 154 can be configured to toggle between displaying these status messages and displaying a current status of each of the motors 106 included in the turntable 100. The motor status may include, for each motor 106, whether the motor 106 is engaged and functioning properly, disengaged and not actively driving the turntable 100, or in an error state and not actively driving the table 100. Other options for displayable content are described in more detail below. In embodiments, the display screen 156 may be a liquid crystal display (LCD), an LED display, or other type of display screen.

The remote control unit 154 can also include a plurality of menu buttons 158 for navigating menu options presented on the display screen 156. In embodiments, the menu buttons 158 can also be used to change which of the status messages are currently displayed on the display screen 156. As shown, the menu buttons 158 include left, right, up, and down buttons. These menu buttons 158 can be used to select between various menu sections and adjust a given menu option's value. Menu sections can include, for example, setting a zero position of the turntable 100, enabling/disabling the motors 106, setting a master/slave setting to synchronize multiple turntables 100, and selecting between manual control and software control modes, as described in more detail below.

In addition, the remote control unit 154 can include a speed control knob 160 for controlling a rotational speed of the turntable 100. A user can utilize the speed control knob 160 to select a speed setting between 1 percent and 100 percent, and the user-selected setting (also referred to as a command speed) can be displayed on the display screen 156. The selected speed setting can be transmitted to the turntable 100 as part of the control signals sent to the central hub 104 by the remote control unit 154. Once a speed setting is selected, the turntable 100 may accelerate or decelerate, as needed, until the turntable motion reaches the command speed. The actual rotational speed of the turntable 100 can vary depending on the maximum load handling ability of the turntable 100 and/or an amount of power input to the table 100. For example, turntables having a higher load capacity may spin slower at the 100% setting than turntables having a lower load capacity.

The remote control unit 154 can also include a direction control knob 162 for controlling a rotational direction, or direction of travel, of the turntable 100. As shown in FIG. 20, the direction control knob 162 has three user-selectable settings: forward rotation, reverse rotation, and stop rotation. These settings of the direction control knob 162 can be used to activate turntable motion in a specific direction or to stop the current motion of the turntable 100. For example, when the knob 162 is set to the stop rotation setting, the turntable 100 can remain stopped, if already stopped, or can decelerate until the table 100 reaches a stop, if the table 100 was moving. When the knob 162 is set to the reverse rotation setting, the turntable 100 can begin rotating in a counter-clockwise direction. And when the knob 162 is set to the forward rotation setting, the turntable 100 can begin rotating in a clockwise direction. The user-selected setting for rotational direction can be displayed on the display screen 156 and can be sent to the turntable 100 as part of the control signals sent to the central hub 104 by the remote control unit 154.

The remote control unit 154 can further include an emergency stop button 164 configured to immediately stop movement of the turntable 100 when activated or pressed. This button 164 may serve as a safety feature for the turntable 100 that should only be engaged when necessary. When the emergency stop button 164 is pressed, a control signal directing the motors 106 to immediately stop rotating may be sent to the central hub 104 by the remote control unit 154. Once the emergency stop button 164 has been pressed, the button 164 may need to be rotated to reset the button 164.

As shown in FIG. 20, the remote control unit 154 can also include one or more communication devices, such as, for example, a cable port 166, a network port 168, and an antenna 170, to facilitate communication with the control box 152, the central hub 104, other turntables within a local network, and/or a central controller (not shown). The cable port 166 can be configured to receive a data and/or communication cable electrically coupled to the control box 152, for example, as shown in FIG. 19. In some cases, the cable port 166 may be configured to receive a power cable. The network port 168 can be configured to connect the remote control unit 154 to an Ethernet cable, or other cable for obtaining an Internet connection or connecting to a local network. In some embodiments, the antenna 170 can be configured to wirelessly communicate data and/or control signals to the central hub 104 and/or the control box 152, to other nearby turntables, as described below, or to a central controller (not shown). In some embodiments, the data cable may be a preferred method of communicating data to the turntable 100 during initial setup and testing modes, and the antenna 170 may be used to wirelessly communicate data during regular operation.

Referring back to the menu options that may be controlled using the menu buttons 158 shown in FIG. 20, the zero position setting for the turntable 100 will now be described. In embodiments, the turntable 100 can include a 16,000-count encoder or position sensor (e.g., within the central hub circuitry) for providing position feedback to the control unit 154. The position feedback, or a current position of the turntable 100, may be provided to the remote control unit 154 by the central hub 104 using one or more of the communication devices described above. The position of the turntable 100 can increase as the table rotates in the clockwise direction, and the turntable position can automatically reset to zero when the position reaches a 16,000 count. Using the control unit 154, this zero position can be reset or customized to meet the needs of a current turntable configuration. For example, the turntable 100 can be manually moved to a desired zero position and the menu buttons 158 can be used, first to navigate the menu sections until a prompt "RESET ZERO?" appears on the display screen 156, and then to select "YES" or otherwise confirm the selection. In some embodiments, the remote control unit 154 can send a control signal to the central hub 104 directing the turntable 100 to stop rotation at a user-selected position, or a target position set using, for example, the menu buttons 158.

Similarly, to engage or disengage select motors 106 using the remote control unit 154, the menu buttons 158 can be used to navigate the menu to the motor selection section and to select a desired setting (e.g., enable or disable) for each motor 106. The user-selected setting for each motor 106 can be provided to the central hub 104 as part of the control signals sent by the remote control unit 154 to the turntable 100. Once a motor 106 is disabled, it can be configured to rotate freely, or in an undriven state. In embodiments, each motor 106 can be assigned a number (e.g., 1, 2, 3) and the motor's status can be displayed on the display screen 156 in association with the motor's assigned number (e.g., "MOTOR 1—ENABLED").

With regard to the master/slave setting, the menu buttons 158 can be used to connect two or more turntables connected to the same network, so that the tables can rotate in synchrony. For example, using the menu buttons 158, a user can navigate to the menu section for setting the turntable 100 as a "master" table or as a "slave" table. In order for the synchronization to work, one table must be configured as the master table and at least one other table must be configured as the slave table. The user can select the appropriate setting for each table using the remote control unit for that table. In embodiments, any number of turntables can be set as a "slave" to a given master table.

Once a turntable is set to slave mode, the table can be configured to rotate until it reaches a zero position that matches the zero position of the master table. Also, when operating in slave mode, the turntable's own motion and speed controls can be disabled, and/or the slave table can be configured to not respond to any motion control commands entered using its own remote control unit. Instead, the slave table can be configured to wait for commands received from the master table.

Once a turntable is set to master mode, motion commands for controlling the master table can be entered using the table's remote control unit, per standard operation. For example, the motion commands can include a rotational speed setting, rotational direction setting, and position setting. Data packets comprising these motion commands can be sent to each slave table(s) within the same network as the master table. The data packets may be provided to the central hub of each slave table as control signals. Using these data packets, the slave tables can synchronize its motion to that of the master table. For example, using the speed setting received from the master table, the slave table(s) can begin matching their speed to that of the master table. Once the speed is matched, the slave table(s) can either slow down or speed up to match their current position to that of the master table. If the motion of the master table changes, updated data packets may be sent to the slave table(s) so that the slave table(s) can adjust their motion to match the current motion of the master table. These steps may continue so long as the slave table(s) continue to receive data packets from the master table. In some embodiments, the master table operation and data packet generation can be controlled using software running on a central controller (not shown), as described below.

In embodiments, the remote control unit 154 can also be configured to operate in a software-based control mode. For example, the control signals provided to the central hub 104 may comprise control settings automatically selected by a processor executing software for controlling the turntable 100. In some cases, the software is executed by a processor (not shown) of the remote control unit 154 and is stored in a memory (not shown) of the remote control unit 154. In other cases, the remote control unit 154 is configured to receive data packets from a central controller that is connected to the same network as the turntable 100. The central controller can be configured to generate the data packets, or control signals, using software executed by a processor of the central controller. In embodiments, the software-based control mode can be used to control a rotational speed, direction of travel, and/or target position of the turntable 100, set-up and control a master/slave mode for the turntable 100 and other turntables within the same network, and/or synchronize the turntable's movement with lighting, LEDs, audio, video, or other media, as explained in more detail below.

In some embodiments, the software used to interface with and/or control the turntable 100 can be configured using programmable DMX (or Digital Multiplex) controls and the Art-Net® protocol, and can be executed by a central controller that also controls show or lighting effects. As will be appreciated, DMX is a standard for digital communication networks that was originally used for controlling lighting and other theater equipment and can also be used to control a variety of non-theatrical scenarios, and Art-Net® is communications protocol for transmitting DMX data over an Internet Protocol (IP) network. In the present case, the DMX data packets transmitted to the remote control unit 154 using the Art-Net® protocol comprise commands for controlling turntable motion. These motion control commands can be synchronized, by the central controller, with lighting, sound, fog, audio, video, or other special effects associated with a presentation involving the vehicle turntable 100. For example, the DMX software can be configured to start, stop, and change direction of the turntable 100 at precise times that coordinate with an audio or video track simultaneously playing in the background. The DMX software can also be configured to facilitate the master/slave operation of the multiple turntables. For example, the same DMX data packets may be simultaneously sent to the master table and each of the slave tables to synchronize operation of the multiple turntables.

In embodiments, the remote control unit 154 can include a menu section for selecting an Art-Net control mode. Using the menu buttons 158, Art-Net control settings for the remote control unit 154 can be selected, including selecting an Art-Net universe, defining a base address of the data packet that contains the first byte of control data, and identifying a User Datagram Protocol (UDP) port that will be monitoring for incoming data packets. Once these settings are selected, the remote control unit 154 can be configured to wait for data packets from the central controller and when received, transfer the motion control commands contained within the data packets to the turntable 100. When set to Art-Net control mode, the remote control unit 154 can be configured to ignore or not respond to other commands, including commands entered using the buttons of the remote control unit 154.

The motion control commands received within the Art-Net data packets are configured to control a speed of rotation, a target position, and a motion control mode that determines how the turntable 100 will move (e.g., rotational direction). In embodiments, each data packet can include four bytes, each data byte providing one of the motion control commands. For example, the first data byte can provide the control mode command, the second data byte can provide the speed of rotation command, and the third and fourth data bytes can provide the target position command. More specifically, the speed of rotation byte can include any value between 1%, or a minimum speed, and 100%, or a maximum speed. The target position byte can generally include a position at which the turntable 100 is directed to stop. The first target position byte can include a coarse position parameter that is incremented by, for example, 1.41 degrees or other predetermined amount, and the second target position byte can include a fine position parameter that is incremented by, for example, 0.0055 degrees or other predetermined amount for more precise control of the target position. The values included in the two target position bytes can be combined to obtain the target position.

The motion control mode byte can include one of five modes: manual, standby, forward, reverse, and stop-at-position. The manual control mode disables the Art-Net control mode and sets the remote control unit 154 back to receiving commends entered via the buttons of the remote control unit 154. The standby control mode directs the turntable 100 to not move, and the table 100 will remain idle regardless of any other inputs until the control mode is changed. The forward control mode directs the turntable 100 to continuously rotate in a clockwise direction at the rotational speed set by the second data byte. The reverse control mode directs the turntable 100 to continuously rotate in a counter-clockwise direction at the rotational speed set by second data byte. Rotation under either the forward or reverse modes will continue until the control mode is changed or the emergency stop button is engaged.

The stop-at-position control mode directs the turntable 100 to stop at the target position. If the turntable 100 is not moving when the target position is set, the turntable 100 will automatically rotate, in whichever direction is closest to the target position, and stop when positioned at the target position. If the turntable 100 is already moving when the target position is set, the turntable 100 will continue rotating in the current direction of travel until the target position is reached. Once the target position has been reached, the turntable 100 will remain there until a new motion control command is received. When the turntable 100 is rotating, the table 100 may have a stopping distance that is linearly related to a current rotational speed. For example, when operating at full speed (e.g., about two RPM), the turntable 100 may require a half turn to stop, and when operating at 50% speed, the turntable 100 may require a quarter turn to stop.

FIG. 21 illustrates an example system 200 for carrying out various turntable operations, as described herein. As shown, the system 200 includes the turntable 100 communicatively coupled to a control unit 202 via a communication network 204. In some embodiments, the system 200 further includes one or more additional turntables, such as the turntable 206, for example, when the system 200 is operating in a master/slave mode. The communication network 204 can comprise one or more wired or wireless networks, including, for example, a wired local network (e.g., Ethernet), a wide area network, a wireless local network (e.g., WiFi), a personal area network (e.g., Bluetooth), or various other networks.

The control unit 202 can include a processor 208, a memory 210, a user interface 212, a communications unit 214 comprising an antenna 216, and a display 218. In some embodiments, the control unit 202 can be the remote control unit 154 shown in FIG. 20. In such cases, the user interface 212 can include the plurality of input devices 158, 160, 162, and 164, the display 218 can include the LCD display 156, and the communications unit 214 can include the data port 166, the network port 168, and the antenna 170 (e.g., as antenna 216). Also in such cases, the turntable 206 may be communicatively coupled to a second control unit (not shown) that is substantially similar to the control unit 202 and/or the remote control unit 154. In addition, the second control unit may be in communication with the control unit 202 via the communication network 204, for example, to carry out operation of the master/slave operation.

In other embodiments, the control unit 202 can be a central controller configured to control multiple turntables and, in some cases, media and lighting related to presenting a show. As an example, the central controller can be any type of computing device, including, a mobile device (e.g., smartphone), a tablet, a laptop, or a desktop computer. In such cases, the user interface 212 can include one or more input devices for receiving user inputs, such as, for example, a keyboard, mouse, touchpad, etc., and the display 218 can include a touchscreen, computer display, or any other type of display screen. Also in such cases, the central controller can be in communication with the remote control unit 154 of the turntable 100 and/or the remote control unit (not shown) of the turntable 206 via the communication network 204.

To enable communication with other components of the system 200, the communications unit 214 of the control unit 202 can be configured to send and receive data over the communication network 204 using one or more network protocols, such as, for example, cellular network protocol, Internet protocol suite (TCP/IP), IEEE 802.11 Wi-Fi, etc. Accordingly, the communication unit 214 can include various network communication equipment and circuitry, such as, for example, a telephonic interface, a cellular communication port, a network interface, a network card, such as an Ethernet card or a wireless connection card, a router, any suitable number of wired and/or wireless transceivers, etc.

The processor 208 is a hardware device and can comprise one or more of a microprocessor, a microcontroller, a programmable logic array, an application-specific integrated circuit, a logic device, or other electronic device for processing, inputting, outputting, manipulating, storing, or retrieving data. In embodiments, the data processor 208 can include a central processing unit (CPU) and/or a graphics processing unit (GPU). In some embodiments, the control unit 202 can comprise a general purpose computer that is programmed with various programming instructions or modules stored in the memory 210 (e.g., data storage device), or elsewhere. When control unit 202 is in operation, the processor 208 can be configured to execute software stored within memory 210, to communicate data to and from the memory 210, and to generally control operations of the control unit 202 pursuant to the software. In addition, the processor 208 can utilize the communication unit 214 to communicate data or control signals to, or receive signals from, the turntable 100 or other components of the system 200, including, for example, motion control commands and other control signals or data packets described herein.

The memory 210 can comprise one or more of electronic memory, nonvolatile random access memory (e.g., RAM), flip-flops, a computer-writable or computer-readable storage medium, a magnetic or optical data storage device, a magnetic or optical disc drive, a hard disk drive, or other electronic device for storing, retrieving, reading, or writing data. The memory 210 is configured to store executable software, some of which may or may not be unique to the system 200. The software in memory 210 may include one or more separate programs, each comprising an ordered listing of machine readable instructions that, when executed by processor 208, cause the processor 208 to perform various acts and/or implement logical functions. As an example, the software in memory 210 may include a suitable operating system (O/S) and a turntable control module 220.

Turntable control module 220 may be a portion of memory 210 that is configured to store software instructions that, when executed by the processor 208, cause the processor 208 to carry out the various turntable operations described herein. In embodiments, the turntable control module 220 can comprise DMX software or program modules for controlling a motion of the turntable 100 in synchrony with lighting, sound, and other media. For example, when included in the central controller, the turntable control module 220 can comprise software instructions for generating data packets that comprise motion control commands for controlling a speed of rotation, a target position, and a motion control mode of the turntable 100; and transmitting the data packets to the turntable 100 (e.g., either directly to the central hub 104 or to the remote control panel 154). The turntable control module 220 can further include software instructions for enabling a user to input and change the motion control commands that are used to generate the data packets, and synchronizing the motion control commands to playback of selected media content and/or presentation of selected environmental effects (e.g., lighting, sound, fog, etc.).

In some embodiments, the turntable control module 220 can comprise software or program modules for carrying out master/slave operations for the turntable 100 and the turntable 206. For example, when included in the central controller, the turntable control module 220 can comprise software instructions for, among other things, receiving one or more control settings for a first turntable (e.g., the turntable 100); receiving a master mode setting from the first turntable; receiving a slave mode setting from a second turntable (e.g., the turntable 206); automatically applying the one or more control settings of the first turntable to the second turntable; and synchronizing a movement of the second turntable to match a movement of the first turntable. In embodiments, the one or more control settings received for the first turntable can include at least one of a direction of travel setting, a target position setting, or a rotational speed setting.

When included in a remote control unit of the slave turntable 206, the turntable control module 220 can be configured differently. In such cases, for example, the module 220 can comprise software instructions for receiving, at a first turntable (e.g., the turntable 206), a slave mode setting via a control unit (e.g., the remote control unit of the turntable 206); receiving one or more control settings from a second turntable (e.g., the turntable 100) via a wireless receiver of the control unit; and applying the one or more control settings to the first turntable. In embodiments, the one or more control settings received from the second turntable can include at least one of a direction of travel setting, a target position setting, or a rotational speed setting.

In some embodiments, the turntable control module 220 can comprise software or program modules for controlling operation of the motors 106 within the turntable 100 in the event of a failure. In such cases, for example, the turntable control module 220 can be included in the remote control unit 154 and can comprise software instructions for synchronizing operation of first, second, and third motors 106 included in the turntable 100; upon detecting failure of the first motor 106a, automatically deactivating the first motor 106a; and upon detecting failure of the second motor 106b, automatically deactivating the second motor 106b. In other embodiments, the turntable control module 220 can comprise software instructions for selectively activating individual motors 106 of the turntable 100 one-by-one as needed to make-up for a failed motor. In such cases, the turntable control module 220 can comprise software instructions for detecting failure of a first motor; in response, automatically activating a second motor and deactivating the first motor; detecting failure of the second motor; and in response, automatically activating a third motor and deactivating the second motor.

Thus, the present disclosure provides an improved vehicle turntable that is capable of, among other things, (1) seamlessly continuing operation in the event of motor failure due to the presence of multiple, simultaneously operating inboard motors (e.g., as compared to the single motor found in conventional turntables); (2) providing more precise motion control due to the use of servomotors, instead of the conventional electric motor; (3) receiving extenders for extending a diameter of the turntable; (4) interfacing with software for communicating data and/or control signals for controlling a rotational speed, direction of travel, target position, and/or other parameters of the turntable, and for synchronizing the turntable motion with lighting, sound, video, and other effects; and (6) synchronizing its movement with one or more other turntables within the same network when set to a master/slave mode. In addition, the vehicle turntable described herein includes a frame assembly and panel configuration that, among other things, (1) makes installation and/or disassembly of the turntable easier and quicker than conventional turntables, (2) minimizes packaging and the amount of storage space required, and (3) enables workers to perform quick repairs without disassembling the turntable or removing a panel.

It should be emphasized that the above-described embodiments, particularly, any "preferred" embodiments, are possible examples of implementations, merely set forth for a clear understanding of the principles of the invention. Many variations and modifications may be made to the above-described embodiment(s) of the invention without substantially departing from the spirit and principles of the invention. All such modifications are intended to be included herein within the scope of this disclosure and protected by the following claims.

The invention claimed is:

1. A system, comprising:
   a vehicle turntable comprising one or more wheels and one or more motors configured to drive the one or more wheels;
   a control unit disposed remotely from the vehicle turntable;
   a turntable hub disposed in a center of the vehicle turntable and configured to control operation of the vehicle turntable based on control signals received from the control unit, wherein the control signals are configured to control operation of the vehicle turntable in synchrony with presentation of one or more special effects; and
   a control device communicatively coupled to the turntable hub and to the control unit, the control device configured to relay control signals between the turntable hub and the control unit, wherein the control device is disposed on or adjacent to the vehicle turntable.

2. The system of claim 1, wherein the control device is communicatively coupled to the control unit via a wireless communication network.

3. The system of claim 1, wherein the control device is coupled to the turntable hub via a wired connection.

4. The system of claim 1, wherein the control signals are configured to stop rotation of the vehicle turntable at a target position, the control signals comprising a number of degrees associated with the target position.

5. The system of claim 1, wherein the control signals are configured to control a direction of travel and a rotational speed of the vehicle turntable, the control signals comprising a numerical speed value for setting the rotational speed of the vehicle turntable.

6. The system of claim 1, wherein the control signals are configured to enable or disable at least one of the one or more motors.

7. The system of claim 1, wherein the control signals comprise user-selected control settings entered into the control unit.

8. The system of claim 1, wherein the control unit comprises a memory and a processor configured to execute software stored in the memory, the software configured to automatically control the vehicle turntable by selecting control settings for the vehicle turntable and including the control settings in the control signals that are sent to the turntable hub.

9. The system of claim 1, wherein the special effects include at least one of lighting effects and sound effects.

10. A system, comprising:
    a first turntable hub configured to control operation of a first vehicle turntable;
    a second turntable hub configured to control operation of a second vehicle turntable; and
    a controller communicatively coupled to the first and second turntable hubs via a wireless communication network and disposed remotely from the first and second vehicle turntables, the controller comprising: a memory, a processor configured to execute software stored in the memory, and a wireless transceiver configured to communicate with each of the first turntable hub and the second turntable hub via the wireless communication network,
    wherein the software is configured to cause the controller to provide a first control signal to the first turntable hub and a second control signal to the second turntable hub, the first control signal configured to control the operation of the first vehicle turntable, and the second control signal configured to control the operation of the second vehicle turntable, and wherein the first control signal includes a master mode setting for the first vehicle turntable, and the second control signal includes a slave mode setting for the second vehicle turntable.

11. The system of claim 10, wherein the second control signal is the same as the first control signal.

12. The system of claim 10, wherein the first and second control signals are configured to simultaneously stop rotation of the first and second vehicle turntables at first and second target positions, respectively, each of the first and second control signals comprising a number of degrees associated with the respective target position.

13. The system of claim 10, wherein the first control signal is configured to control a direction of travel and rotational speed for the first vehicle turntable, and the second control signal is configured to control a direction of travel and rotational speed for the second vehicle turntable, each control signal comprising a numerical speed value for setting the rotational speed of the respective vehicle turntable.

14. The system of claim 13, wherein the first control signal is configured to cause the first vehicle turntable to rotate in a first direction of travel at a first rotational speed, and the second control signal is configured to cause the second vehicle turntable to rotate in a second, opposing direction of travel at the first rotational speed.

15. The system of claim 10, wherein the first and second control signals include user-selected control settings.

16. A system, comprising:
a plurality of turntable hubs configured to respectively control operation of a plurality of vehicle turntables, each turntable hub situated in a center of the corresponding vehicle turntable; and
a controller disposed remotely from the plurality of vehicle turntables and configured to provide control signals to each of the plurality of turntable hubs for controlling the operation of the corresponding vehicle turntable,
wherein a first one of the turntable hubs is configured to operate as a master device, and each remaining turntable hub is configured to operate as a slave device.

17. The system of claim 16, wherein the control signals are configured to stop rotation of each vehicle turntable at a selected position.

18. The system of claim 16, wherein the control signals are configured to control a direction of travel and a rotational speed of each vehicle turntable.

19. The system of claim 16, wherein the control signals include a first control signal configured to cause movement of the first vehicle turntable and a second control signal configured to synchronize a movement of the second vehicle turntable to the movement of the first vehicle turntable.

20. The system of claim 16, wherein the controller comprises a memory and a processor configured to execute software stored in the memory, the software being configured to cause the controller to generate and provide the control signals to the plurality of turntable hubs.

21. The system of claim 16, wherein the controller is a central controller communicatively coupled to each of the turntable hubs via a communication network.

* * * * *